(12) United States Patent
Takaku et al.

(10) Patent No.: US 6,502,388 B2
(45) Date of Patent: Jan. 7, 2003

(54) ENGINE EXHAUST GAS CLEANING SYSTEM

(75) Inventors: Yutaka Takaku, Mito (JP); Toshio Ishii, Mito (JP); Shigeru Kawamoto, Hitachi (JP); Shinji Nakagawa, Hitachinaka (JP); Minoru Oosuga, Hitachinaka (JP); Yoshihisa Fujii, Hitachinaka (JP)

(73) Assignee: Hitachi Ltd., Tokyo (JP)

( * ) Notice: Subject to any disclaimer, the term of this patent is extended or adjusted under 35 U.S.C. 154(b) by 0 days.

(21) Appl. No.: 09/790,688

(22) Filed: Feb. 23, 2001

(65) Prior Publication Data

US 2001/0015066 A1 Aug. 23, 2001

(30) Foreign Application Priority Data

Feb. 23, 2000 (JP) ........................................ 2000-052090

(51) Int. Cl.⁷ ................................................. F01N 3/00
(52) U.S. Cl. ............................. 60/285; 60/276; 60/277; 60/301
(58) Field of Search .......................... 60/277, 278, 285, 60/301, 276

(56) References Cited

U.S. PATENT DOCUMENTS

| | | | | |
|---|---|---|---|---|
| 5,743,084 A | * | 4/1998 | Hepburn | 60/277 |
| 5,771,685 A | | 6/1998 | Hepburn | 60/274 |
| 6,230,487 B1 | * | 5/2001 | Blumenstock et al. | 60/277 |
| 6,324,834 B1 | * | 12/2001 | Schnaibel et al. | 60/274 |

FOREIGN PATENT DOCUMENTS

| | | |
|---|---|---|
| JP | 8-260949 | 10/1996 |
| JP | 2692380 | 9/1997 |
| JP | 10-128058 | 5/1998 |

* cited by examiner

Primary Examiner—Thomas Denion
Assistant Examiner—Diem Tran
(74) Attorney, Agent, or Firm—Crowell & Moring LLP

(57) ABSTRACT

An object of the present invention is to provide an engine exhaust gas cleaning system which can accurately judge whether or not there is the remaining capacity in an NOx trapping amount of an NOx trapping agent, can optimize the timing of NOx purge control, and can diagnose the deterioration of the NOx trapping agent.

The present invention is characterized by an engine exhaust gas cleaning system comprising an operating control parameter changing means for changing operating control parameters of the engine in order to change an amount of NOx trapped to the NOx trapping agent; a concentration detecting means for detecting a concentration of a specified component in the exhaust gas at a position downstream of the NOx trapping agent; an air-fuel ratio changing means for temporarily changing the air-fuel ratio of the exhaust gas to a stoichiometric air-fuel ratio or a rich air-fuel ratio with a preset period; and an NOx trapping amount change detecting means for detecting change in the amount of NOx trapped to the NOx trapping agent based on change in a detected result of the concentration detecting means when the air-fuel ratio is changed after changing the operating control parameter.

21 Claims, 10 Drawing Sheets

ENGINE EXHAUST GAS CLEANING SYSTEM

BACKGROUND OF THE INVENTION

1. Field of the Invention

The present invention relates to an engine exhaust gas cleaning system.

2. Description of the Prior Art

It is a well known technology in the art that an air-fuel ratio is set to a value excess in air concentration (hereinafter referred to as lean air-fuel ratio) more than the theoretical air-fuel ratio (hereinafter referred to as stoichiometric air-fuel ratio) to perform lean combustion in order to improve fuel economy of an engine.

For example, there are known a technology that lean combustion under an air-fuel ratio of 20 to 25 is attained in an engine of a type in which fuel is injected at a position near an intake port of an intake pipe portion (port injection type), and a technology that very lean combustion under an air-fuel ratio of 40 to 50 is attained by forming a stratified mixed gas in an engine of a type in which fuel is directly injected into a cylinder (in-cylinder injection type). In these technologies, fuel economy can be improved by lean combustion, that is, by increasing an amount of intake air to decrease pumping loss and heat loss.

In the case of stoichiometric combustion, exhaust gas can be cleaned by oxidizing and reducing HC, CO and NOx in the exhaust gas at a time using a three way catalyst. However, in the case of lean combustion, it is difficult to reduce NOx because the exhaust gas is in an oxygen excess state. In order to solve the problem, there is known an exhaust gas cleaning system for an engine. The exhaust gas cleaning system is that an NOx trapping agent which traps NOx in the exhaust gas by absorption or adsorption when the air-fuel ratio of the exhaust gas is lean and releases NOx to reduce or contact-reduce the NOx when the air-fuel ratio of the exhaust gas is rich (fuel excess) is disposed in the exhaust gas passage, and the air-fuel ratio of the exhaust gas is temporarily changed from a lean air-fuel ratio to the stoichiometric air-fuel ratio or a rich air-fuel ratio in an appropriate cycle to release or to reduce the NOx trapped to the NOx trapping agent in order to recover the NOx trapping ability (hereinafter, referred to as "purge").

In such an exhaust gas cleaning system, it is preferable from the viewpoint of the fuel economy and reduction of the exhaust gas components such as HC in the exhaust gas to temporarily change the air-fuel ratio to the stoichiometric air-fuel ratio or the rich air-fuel ratio only for a time period which is commensurate with an amount of the trapped NOx.

A technology for judging completion of release of NOx when the air-fuel ratio is temporarily changed to the stoichiometric air-fuel ratio or the rich air-fuel ratio is proposed in Japanese Patent No. 2692380 (WO94/17291). The completion of release of NOx after temporarily changing the air-fuel ratio from the lean air-fuel ratio to the stoichiometric air-fuel ratio or the rich air-fuel ratio is judged from the time when an air-fuel ratio detected by an air-fuel ratio sensor disposed downstream of an NOx trapping agent is switched from a lean state to a rich state. This is based on the fact that the air-fuel ratio detected by the air-fuel ratio sensor disposed downstream of the NOx absorbent is shown to be slightly lean because HC and CO in the exhaust gas are consumed in reduction of the NOx until the NOx absorbed to the NOx absorbent is released and reduced even if the air-fuel ratio upstream of the NOx absorbent becomes the stoichiometric air-fuel ratio or the rich air-fuel ratio, and consequently the air-fuel ratio detected by the air-fuel ratio sensor becomes rich after completion of release and reduction of the NOx absorbed to the NOx absorbent.

As a similar technology, Japanese Patent Application Laid-Open No. 10-128058 (U.S. Pat. No. 5,771,685) discloses a technology that the performance of an NOx trapping agent is monitored by estimating an amount of trapped NOx from a time interval between the time when the air-fuel ratio is switched from a lean air-fuel ratio to the stoichiometric air-fuel ratio or a rich air-fuel ratio and the time when the air-fuel ratio detected by the air-fuel ratio sensor disposed downstream of the NOx trapping agent is switched from a lean state to a rich state.

Further, Japanese Patent Application Laid-Open No. 8-260949 discloses a technology that the NOx absorbing performance and the oxygen storage capacity of the NOx absoebent are separated from each other because an output of the air-fuel ratio sensor is influenced by the NOx absorbent and the oxygen storage capacity possessed by a catalyst disposed at an upstream or downstream position close to the air-fuel ratio sensor when the performance of the NOx absorbent is monitored based on the air-fuel ratio detected by the air-fuel ratio sensor disposed at the position downstream of the NOx absorbent. In this technology, the oxygen storage capacity is detected by an output of the air-fuel ratio sensor disposed at the position downstream of the NOx absorbent when the amount of the absorbed NOx is nearly zero.

However, the output waveform of the air-fuel ratio sensor disposed downstream of the NOx trapping agent is affected an amount of the reducers such as HC, CO and so on flowing into the NOx trapping agent even if the amount of the NOx trapped to the NOx trapping agent is constant. Although the conventional technology discloses a method of estimating the amount of the reducers from an air-fuel ratio, the conventional technology does not take into consideration variations in controlled air-fuel ratio and what percentage of the reducers such as HC, CO and so on flowing into the NOx absoebent is actually used for reducing the absorbed NOx. Actually, the amount of the reducers exhausted from an engine is not totally used for the reduction of the NOx trapped to the NOx trapping agent, but part of the reducer is oxidized in the NOx trapping agent and in the catalyst arranged at a position upstream of the NOx trapping agent. Therefore, the percentage of the reducers used for the reduction of the NOx trapped to the NOx trapping agent to the total amount of the reducers exhausted from the engine is influenced by variations in operating condition and in the catalyst performance due to deterioration because the percentage differs depending on the performance of the NOx trapping agent and the catalyst performance (also influenced by the oxygen storage capacity) of the catalyst arranged upstream of the NOx trapping agent.

Further, because the performance of the NOx trapping agent is strongly influenced by temperature of the exhaust gas (temperature of the NOx trapping agent itself), the amount of trapped NOx is reduced, for example, when the exhaust gas temperature is too high even if the NOx itself is not deteriorated. Therefore, it may be erroneously judged that the NOx trapping agent is deteriorated. Furthermore, since the lean combustion is performed by delicate control of fuel injection timing and enhancement of intake air flow in the case of the in-cylinder injection type engine, the exhaust gas temperature sometimes fluctuates even if the engine is in a similar operating condition (rotating speed, load). However, the conventional technologies described above do not take the variations in the temperature into consideration. By mounting a temperature sensor and directly measuring the temperature of the NOx trapping agent to correct the temperature effect, the effect of the above-mentioned variations can be reduced. However, the cost is increased because it is necessary to use a comparatively highly accurate temperature sensor. In addition, it is also necessary to diagnose the temperature sensor itself, and accordingly the system becomes complex and high in cost.

Further, the output waveform of the air-fuel ratio sensor arranged downstream of the NOx trapping agent is influenced by the NOx trapping agent itself and/or the oxygen storage capacity of the catalysts closely arranged upstream and downstream of the NOx trapping agent even if the amount of NOx trapped to the NOx trapping agent is an equal value.

For example, if the NOx trapping agent itself has an oxygen storage capacity or the catalyst having the oxygen storage capacity is closely arranged upstream or downstream of the NOx trapping agent, oxygen is stored in the NOx trapping agent or the catalyst during lean operation of the engine, and the storaged oxygen is released when the air-fuel ratio is switched from the lean air-fuel ratio to the stoichiometric air-fuel ratio or the rich air-fuel ratio. Therefore, the output of the air-fuel ratio sensor arranged downstream of the catalyst or the like having the oxygen storage capacity is influenced by the oxygen released from the catalyst or the like.

Therefore, when the trapped amount or the trapping performance of NOx trapped to the NOx trapping agent is estimated using the above-mentioned air-fuel ratio sensor, the oxygen storage capacity may become a large error factor. For example, if an amount of oxygen storage is large, the time period that the output of the air-fuel ratio sensor arranged downstream of the NOx trapping agent shows a lean state is lengthened when the air-fuel ratio is temporarily changed from the lean air-fuel ratio to the stoichiometric air-fuel ratio or the rich air-fuel ratio. Therefore, an amount of the trapped NOx is erroneously judged to be larger. On the other hand, if an amount of oxygen storage is small, the output of the air-fuel ratio sensor arranged downstream of the NOx trapping agent shows a rich state early when the air-fuel ratio is temporarily changed from the lean air-fuel ratio to the stoichiometric air-fuel ratio or the rich air-fuel ratio. Therefore, an amount of the trapped NOx is erroneously judged to be smaller.

Although the amount of oxygen storage reaches the oxygen storage capacity in a short time by performing lean operation, the oxygen storage capacity itself varies due to deterioration or the like to cause the erroneous judgment of NOx trapped amount described above.

The conventional technology disclosed in Japanese Patent Application Laid-Open No. 8-260949 requires a process that the amount of the NOx absorbed is brought to nearly zero in order to detect the oxygen storage capacity. Therefore, the operating condition at detecting the oxygen storage capacity is not always equal to the operating condition at detecting the amount of the NOx absorbed, and accordingly the oxygen storage capacity varies depending on the exhaust temperature difference. The detection error in the oxygen storage capacity is further increased by the variations of the air-fuel ratio, as described above.

SUMMARY OF THE INVENTION

An object of the present invention is to provide an engine exhaust gas cleaning system which can precisely detect NOx trapping performance of an NOx trapping agent by reducing the effects of variations and detection errors without high costs.

In order to solve the above-described problem, the present invention is characterized by an engine exhaust gas cleaning system comprising an NOx trapping agent arranged inside an exhaust gas passage of an engine, the NOx trapping agent trapping NOx in an exhaust gas by adsorbing or absorbing when an air-fuel ratio of the exhaust gas flowing thereinto is a lean air-fuel ratio, the NOx trapping agent purging by releasing and/or reducing the trapped NOx when a concentration of oxygen in the exhaust gas is reduced; and an air-fuel ratio changing means for temporarily changing the air-fuel ratio of the exhaust gas from a lean air-fuel ratio to a stoichiometric air-fuel ratio or a rich air-fuel ratio with a preset period, which further comprises a concentration detecting means for detecting a concentration of a specified component in the exhaust gas at a position downstream of the NOx trapping agent in the exhaust gas passage; an operating control parameter changing means for changing operating control parameters of the engine in order to change an amount of NOx trapped to the NOx trapping agent; and an NOx trapping amount change detecting means for detecting change in the amount of NOx trapped to the NOx trapping agent based on change in a detected result of the concentration detecting means at the time of the air-fuel ratio changing means temporarily changing the air-fuel ratio of the exhaust gas to the stoichiometric air-fuel ratio or the rich air-fuel ratio when the operating control parameter changing means changes the operating control parameters to change the amount of trapped NOx.

The engine exhaust gas cleaning system of the present invention is preferably characterized by that the operating control parameter changing means changes a time period in which the air-fuel ratio of the exhaust gas is lean.

The engine exhaust gas cleaning system of the present invention is preferably characterized by that the operating control parameter changing means changes a releasing amount of NOx from the engine during a time period in which the air-fuel ratio of the exhaust gas is lean.

The engine exhaust gas cleaning system of the present invention is preferably characterized by that the operating control parameter changing means changes at least any one of ignition timing, fuel injection timing, an EGR ratio and an air-fuel ratio in order to change a releasing amount of NOx from the engine during a time period in which the air-fuel ratio of the exhaust gas is lean.

The engine exhaust gas cleaning system of the present invention is preferably characterized by that the concentration detecting means measures any one of oxygen concentration, NOx concentration, HC concentration and Co concentration in the exhaust gas.

The engine exhaust gas cleaning system of the present invention is preferably characterized by that the operating control parameter changing means changes the operating parameter in order to increase or decrease a predetermined NOx trapping amount, and the engine exhaust gas cleaning system further comprises an NOx trapping agent performance judging means for judging NOx trapping performance of the NOx trapping agent based on a detecting result of the NOx trapping amount change detecting means.

The engine exhaust gas cleaning system of the present invention is preferably characterized by that the NOx trapping agent performance judging means judges that the NOx trapping performance of the NOx trapping agent is deteriorated when a detecting result of the NOx trapping amount change detecting means is not larger than a predetermined value.

The engine exhaust gas cleaning system of the present invention is preferably characterized by that the operating control parameter changing means changes the operating parameter in order to increase or decrease a predetermined NOx trapping amount, and the engine exhaust gas cleaning system further comprises a lean operating time period changing means for changing a time period in which the air-fuel ratio of the exhaust gas is lean based on a detected result of the NOx trapping amount change detecting means.

The engine exhaust gas cleaning system of the present invention is preferably characterized by that the engine exhaust gas cleaning system comprises an NOx trapping performance judging means for judging that the NOx trapping performance of the NOx trapping agent is deteriorated when a lean operating time period changed by the lean operating time period changing means becomes smaller than a predetermined value.

The engine exhaust gas cleaning system of the present invention is preferably characterized by that the engine exhaust gas cleaning system comprises a lean operation limiting means for limiting lean operation when the NOx trapping performance judging means judges that the NOx trapping agent is deteriorated.

The engine exhaust gas cleaning system of the present invention is preferably characterized by that the engine exhaust gas cleaning system memorizes a code expressing deterioration of the NOx trapping agent and/or generates a warning when the NOx trapping performance judging means judges that the NOx trapping agent is deteriorated.

According to the present invention, when the operating parameter is changed in order to change the amount of trapped NOx of the NOx trapping agent, the change in the amount of trapped NOx of the NOx trapping agent is detected from the detected result of the concentration detecting means. Therefore, it is possible to provide an engine exhaust gas cleaning system which can accurately detect the change in the amount of trapped NOx without being affected by various kinds of factors.

DESCRIPTION OF THE PREFERRED EMBODIMENTS

Figure 1:
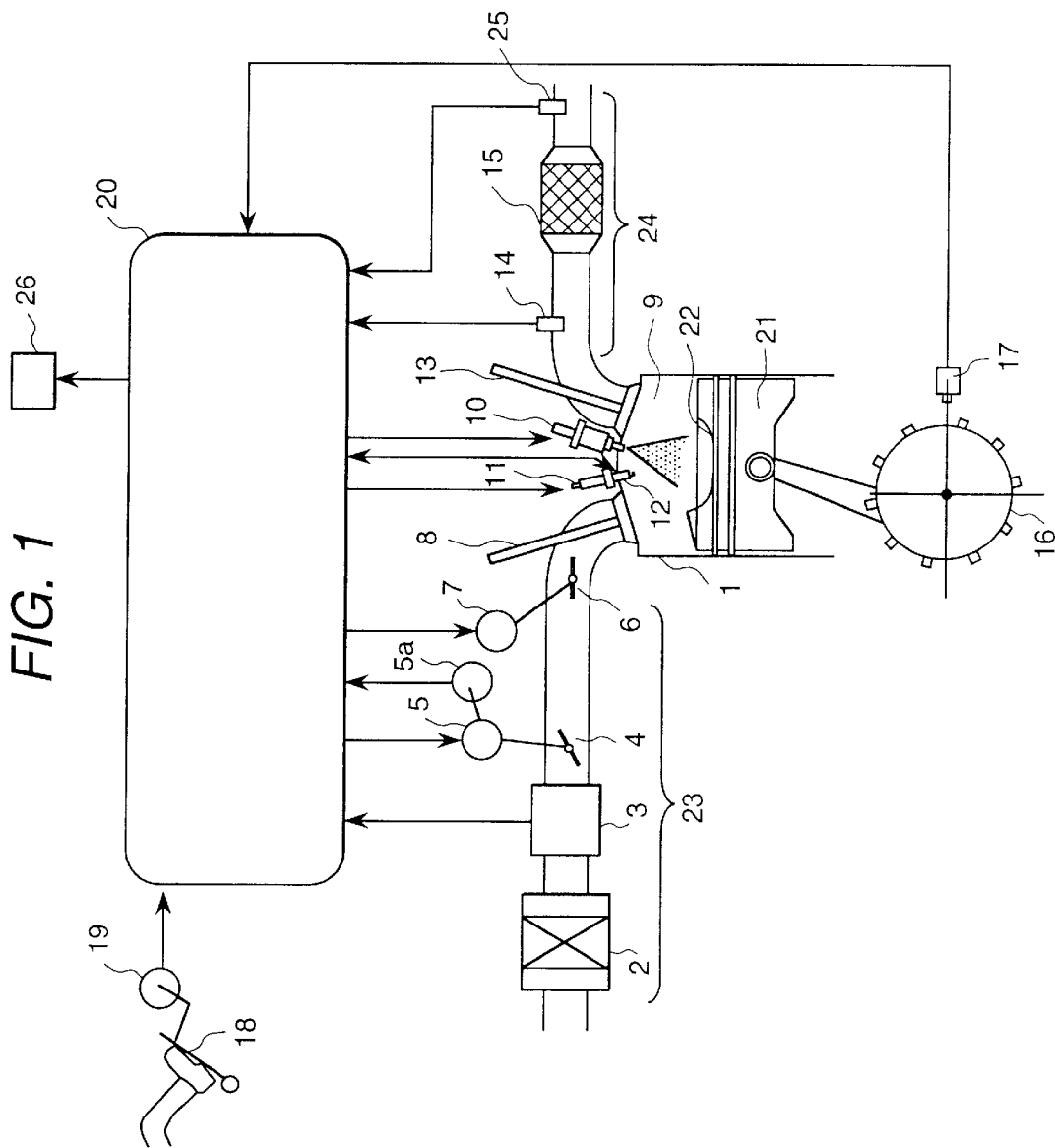
FIG. 1 is a schematic view showing an engine exhaust gas cleaning system in accordance with the present invention.

FIG. 1 is a schematic view showing the construction of an embodiment of an engine exhaust gas cleaning system in accordance with the present invention. The embodiment is an example of an in-cylinder injection type. An intake system 23 of an engine 1 comprises an air cleaner 2, an air flow sensor 3 for detecting an amount of intake air, a throttle valve 4 for adjusting the amount of intake air, a throttle valve driving means 5 and a throttle opening degree sensor 5a, a swirl control valve 6, a swirl control valve driving means 7, and an intake valve 8. The swirl control valve 6 is arranged at a position just before the intake valve 8 for each cylinder, and is constructed so as to be operated together with the intake valve 8. In a combustion chamber 9 of the engine 1, there are provided a fuel injection valve 10 for directly injecting fuel into the combustion chamber 9, an ignition plug 11, and an in-cylinder pressure sensor 12. In an exhaust gas system 23 of the engine 1, there are provided an exhaust gas valve 13, a first air-fuel ratio sensor 14, an NOx trapping agent 15, and a second air-fuel ratio sensor 25. There are provided a sensing plate 16 attached to a crank shaft of the engine 1, a crank angle sensor 17 for detecting a rotating speed and a crank angle by detecting a projected portion of the sensing plate 25, and an accelerator sensor 19 for detecting a step-in amount of an accelerator 18.

Detected values of the sensors are individually input to an electronic control circuit (hereinafter, referred to as ECU) 20, and the ECU 20 detects or calculates an accelerator step-in amount, an intake air amount, a rotating speed, a crank angle, an in-cylinder pressure, a throttle opening degree and so on. Then, based on the results, the ECU 20 calculates an amount and a timing of fuel supplied to the engine 1 to output a drive pulse to the fuel injection valve 10, calculates an opening degree of the throttle valve 4 to output a control signal to the throttle valve driving means 5, and calculates an ignition timing to output an ignition signal to the ignition plug 11. Further, for example, when the NOx trapping agent 15 is judged to be deteriorated, the ECU 20 outputs a signal to a warning light 26 for warning a driver.

Fuel is pumped by a fuel pump from a fuel tank, not shown, and kept at a predetermined pressure (5 to 15 MPa) by a fuel pressure regulator, and then supplied to the fuel injection valve 10. An appropriate amount of the fuel is directly injected into the combustion chamber 9 at an appropriate timing by the drive pulse output from the ECU 20. As operating modes of the engine 1, there are a stoichiometric operation mode, a homogeneous lean operation mode, a stratified lean operation mode and so on. During the homogeneous lean operation mode, the fuel is injected in the intake stroke to mix with air, and the homogeneous mixed gas is burned. During the stratified lean operation mode, the fuel is injected in the compression stroke to distribute the fuel in a stratified shape in the mixed gas so as to gather the fuel (forming a dense mixed gas) near the ignition plug 11.

The intake air regulated by the throttle valve 4 flows into the combustion chamber through the intake valve 8. At that time, the swirl intensity of the intake air is controlled by the swirl control valve 6. In general, the swirl intensity is high during the stratified lean operation mode and the homogeneous lean operation mode, and during the other operation mode the swirl intensity is set low. Particularly, during the stratified operation mode, the fuel is not expanded over the combustion chamber 9, but concentrated near the ignition plug 11 by the fuel injection timing and the swirl air flow described above, and by a shape of a cavity 22 provided on the top surface of a piston 21.

The mixed gas of fuel and intake air is ignited by the ignition plug 9 to be burned. The exhaust gas after combustion is released to the exhaust gas system 24 through the exhaust valve 13. The exhaust gas flows into the NOx trapping agent 15 disposed in the exhaust gas system 24.

The first air-fuel ratio sensor 14 outputs a signal corresponding to a concentration of oxygen in the exhaust gas in the upstream portion of the NOx trapping agent 15, and an actual air-fuel ratio can be detected from the output. The air-fuel ratio of the supplied mixed gas is feedback controlled based on the actual air-fuel ratio detected by the first air-fuel ratio sensor 14 so as to become a target air-fuel ratio.

The second air-fuel ratio sensor 25 outputs a signal corresponding to a concentration of oxygen in the exhaust gas in the downstream portion of the NOx trapping agent 15, and an actual sir-fuel ratio can be detected from the output. An amount of NOx trapped to the NOx trapping agent is judged based on the actual air-fuel ratio detected by the second air-fuel ratio sensor 25.

Figure 2:
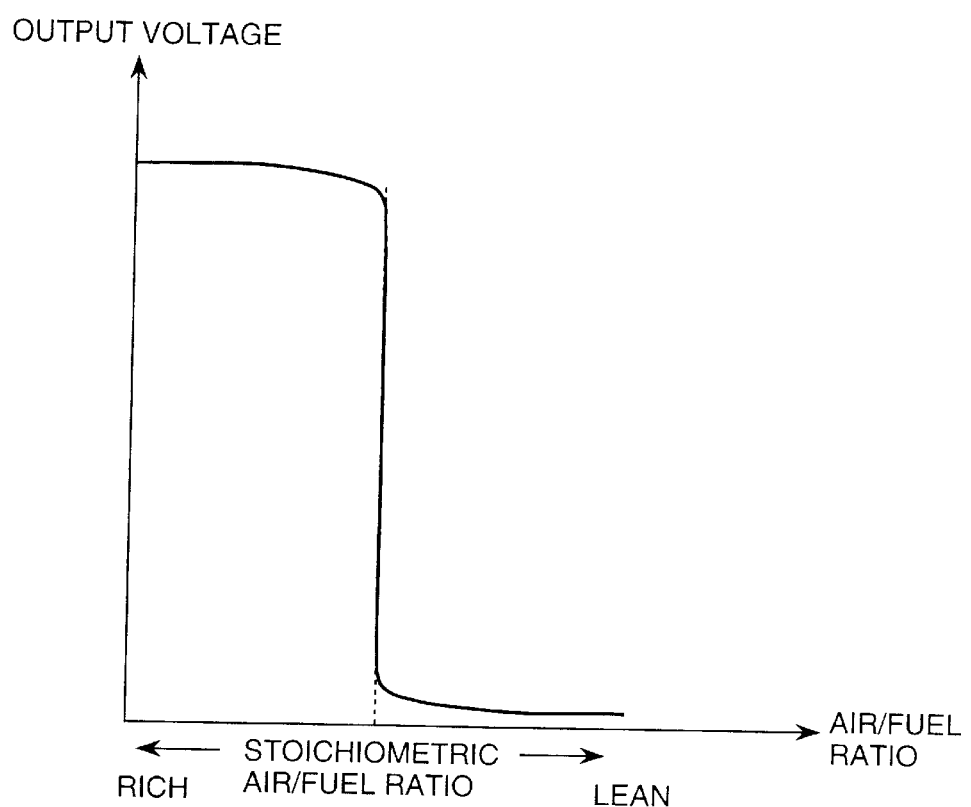
FIG. 2 is a graph showing the characteristic of an air-fuel ratio sensor.

Although the second air-fuel ratio sensor 25 used in the present embodiment is a so-called $O_2$ sensor which outputs a near-binary value steeply changing at a position near the stoichiometric air-fuel ratio as shown in FIG. 2, the sensor is not limited to the $O_2$ sensor. For example, the second air-fuel ratio sensor 25 may be a so-called wide range air-fuel ratio sensor which generates a nearly-linear output corresponding to an air-fuel ratio based on the concentration of oxygen in the exhaust gas.

A passage and an EGR valve, not shown, are arranged between the exhaust gas system 24 and the intake system 23. Particularly, during the stratified operation mode, a large amount of EGR is introduced in order to suppress generation of NOx and suppress combustion speed.

Figure 3:
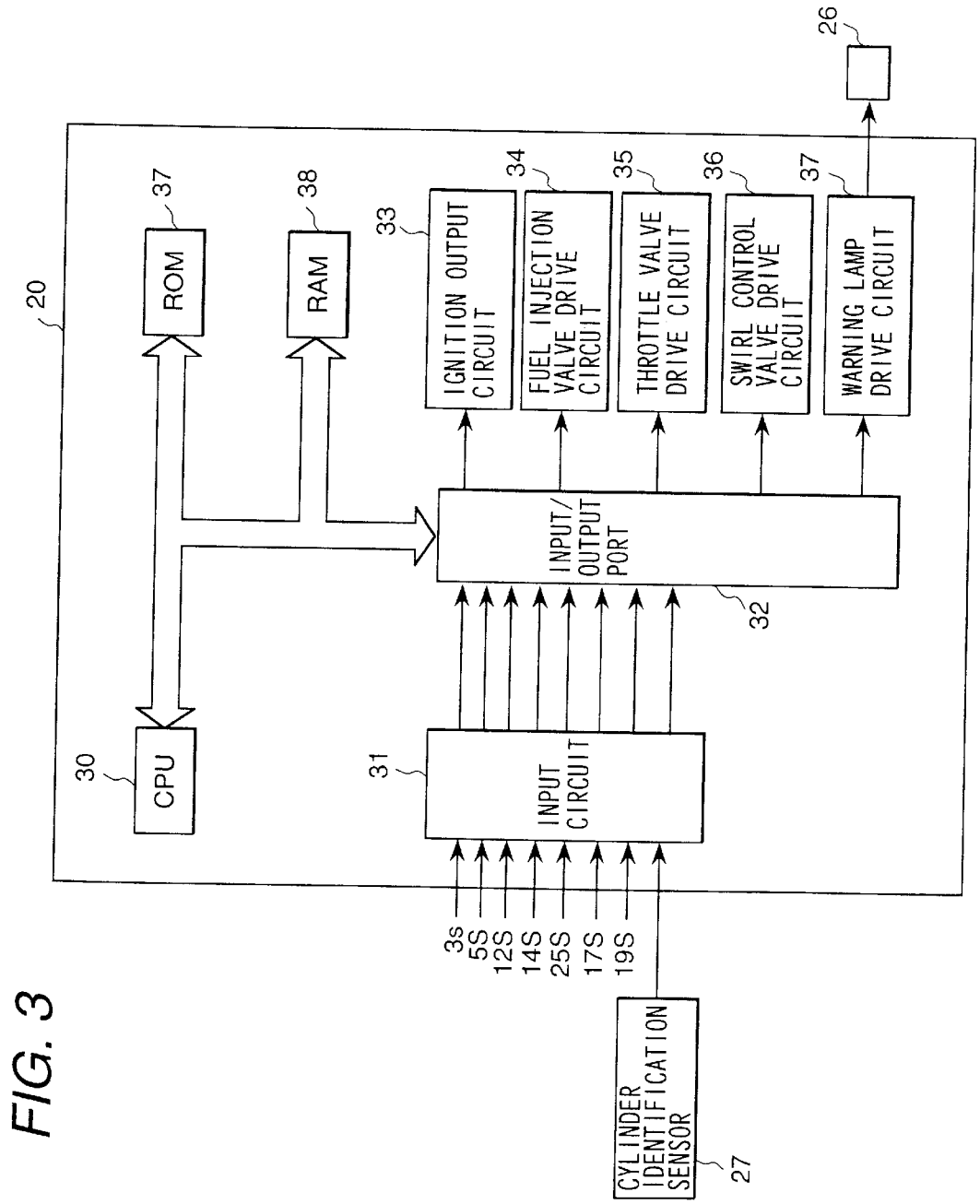
FIG. 3 is a block diagram showing the construction of an ECU.

FIG. 3 shows the construction of the ECU 20. Signals 3s, 5s, 12s, 14s, 25s, 17s, 19s of the air flow sensor 3, the throttle valve opening degree sensor 5a, the in-cylinder pressure sensor 12, the first air-fuel ratio sensor 14, the second air-fuel ratio sensor 25, the crank angle sensor 17, the accelerator sensor 19, and a signal of a cylinder identification sensor 27, not shown, are input to an input circuit 31. A CPU 30 reads these input signals through an input/output port 32 based on a program and constants stored in a ROM 37, and executes calculation processing.

Further, as the calculation results, the CPU 30 outputs the ignition timing, the injector drive pulse width and timing, the throttle valve opening degree command and the swirl control valve opening degree command to an ignition output circuit 33, a fuel injection valve drive circuit 34, a throttle valve drive circuit 35 and a swirl control valve drive circuit 36 through the input/output port 32 to execute ignition control, fuel injection control, throttle valve opening control and swirl control valve opening control. Furthermore, for example, when the NOx trapping agent 15 is judged to be deteriorated, the warning light 26 is switched on by a warning light drive circuit 37. A RAM 38 is used for storage input signal values and calculated results.

A fuel injection time period Ti is calculated, for example, using the following equation based on the program and the constants storaged in the ROM 37, and fuel is injected though the fuel injection valve 10 to be supplied to the engine 1.

$$Ti = K \cdot (Qa/Ne) \cdot TGFBA \cdot ALPHA \cdot Kr,$$

where K is a coefficient based on the characteristic of the fuel injection valve 10 and so on, Qa is an amount of intake air, Ne is a rotating speed of the engine, TGFBA is a target equivalent ratio of the mixed gas to be supplied to the engine 1, and ALPHA is a feed back correction coefficient. Kr is an air-fuel ratio correction coefficient at air-fuel ratio changing control (hereinafter, referred to as NOx purge control) in which the air-fuel ratio of the exhaust gas is temporarily changed from a lean air-fuel ratio to the stoichiometric air-fuel ratio or a rich air-fuel ratio with a predetermined period.

Figure 4:
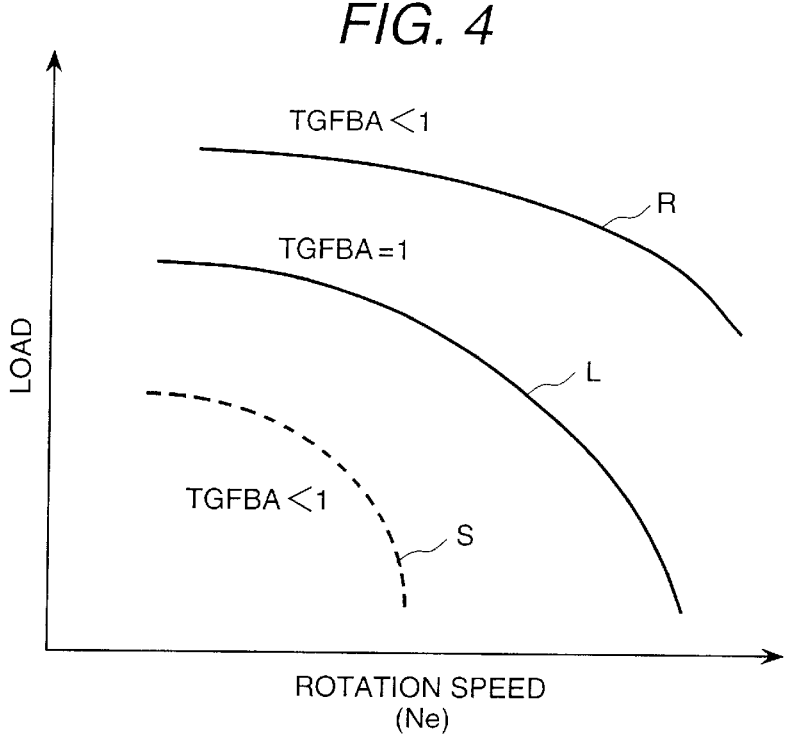
FIG. 4 is a map showing a target equivalent ratio for each of operating ranges.

When the target equivalent ratio TGFBA=1, the mixed gas supplied to the engine is stoichiometric. On the other hand, when TGFBA<1, the mixed gas supplied to the engine is lean. When TGFBA>1, the mixed gas supplied to the engine is rich. For example, a map of the engine rotating speed Ne and the load (for example, target torque calculated based on the signal of the accelerator sensor 19 detecting am amount of stepping-in of the accelerator pedal 18) is pre-storaged in the ROM 37, as shown in FIG. 4. That is, the target equivalent ratio TGFBA is lean in the operation region of load lower than the solid line L; the target equivalent ratio TGFBA is stoichiometric in the operation region of load between the solid line L and the solid line R, that is, TGFBA=1; and the target equivalent ratio TGFBA is rich in the operation region of load higher than the solid line R, that is, TGFBA>1. Further, in the operation region of load lower than the dotted line S within the operation region of load lower than the solid line L, combustion by a very lean mixed gas having an air-fuel ratio of 40 to 50 is performed by forming a stratified mixed gas flow (stratified lean operation). In the operation region of load between the solid line L and the dotted line S, combustion by a lean mixed gas having an air-fuel ratio of 20 to 25 is performed by forming a homogeneous mixed gas flow (homogeneous lean operation).

In the stoichiometric operation (TGFBA=1, Kr=1), feedback control is performed based on the actual air-fuel ratio detected by the first air-fuel ratio sensor 14 so that the air-fuel ratio accurately becomes the stoichiometric air-fuel ratio, and the feedback correction coefficient ALPHA is calculated to reflect it to the fuel injection time period Ti. The feedback correction coefficient ALPHA is generally fluctuated around 1.0 by decreasing when the actual air-fuel ratio becomes rich and by increasing when the actual air-fuel ratio becomes lean. The feedback correction coefficient ALPHA is fixed to an appropriate value or a leaned value when the operation mode is other than the stoichiometric operation.

In the lean operation (TGFBA<1, Kr=1), NOx gas in the exhaust gas is trapped to the NOx trapping agent 15. When the NOx trapping amount reaches a predetermined amount (in a predetermined time period), the operating condition is switched to TGAFBA=1, Kr=1, that is, to the low oxygen concentration state of the stoichiometric air-fuel ratio or the rich air-fuel ratio (NOx purge control). Under this condition, while the NOx trapped to the NOx trapping agent by adsorption or absorption is being released, the released NOx is reduced by HC and CO in the exhaust gas. Otherwise, the NOx kept in being trapped to the NOx trapping agent is contact-reduced by HC and CO in the exhaust gas. Thus, the trapping ability is recovered. Therein, in the case of the in-cylinder injection type engine in the present embodiment, when the air-fuel ratio is switched to the stoichiometric air-fuel ratio or the rich air-fuel ratio, the air-fuel ratio is changed by mainly operating the throttle valve 6 toward the closing direction using the throttle valve drive means 5 to decrease the intake air amount and at the same time controlling the supplied fuel amount. However, the method of changing the air-fuel ratio is not limited to the above-described method.

The NOx trapping agent 15 is constructed so as to also have a so-called three way catalyst performance in order to secure NOx trapping during the lean operation and the exhaust gas cleaning performance during the stoichiometric operation. The NOx trapping agent 15 is constructed, for example, in such that alumina is used as the catalyst substrate, and an alkaline metal or an alkaline earth such as sodium Na, barium Ba or the like and a noble metal such as platinum Pt, rhodium Rh or the like are supported on the substrate. Further, in order to improve so-called three way performance during the stoichiometric operation, there are some NOx trapping agent supporting cerium Ce which has an oxygen storage capacity. The NOx trapping agent 15 traps NOx when the air-fuel ratio of the exhaust gas flowing into it is lean. The NOx trapping agent 15 releases the NOx when the oxygen concentration in the exhaust gas is decreased (when the air-fuel ratio of the exhaust gas becomes stoichiometric or rich), and at the same time, the NOx is reduced by reacting with the reducing agent of HC, CO and the like in the exhaust gas under the catalytic action of, for example, platinum Pt. Otherwise, NOx is contact-reduced by HC, CO and the like in the exhaust gas while the NOx is in the state of being trapped to the NOx trapping agent. By doing so, the trapping ability of the NOx trapping agent can be recovered, and in addition to the above, the amount of NOx emitted to the atmosphere can be decreased. Further, since HC and CO in the exhaust gas are oxidized by the catalytic action of, for example, platinum Pt during the stoichiometric operation, the amount of these harmful components can be also decreased.

In addition, there are some NOx trapping agents which have an action of reducing part of NOx by HC, CO and the like in the exhaust gas even if the air-fuel ratio of the exhaust gas flowing therein is lean, though it depends on the kind of the NOx trapping agent.

As described above, NOx is trapped to the NOx trapping agent 15 when the air-fuel ratio of the exhaust gas is lean. However, because there is a limitation in the NOx trapping capacity of the NOx trapping agent 15, the NOx trapping agent 15 becomes unable to trap NOx anymore when it traps NOx until the trapping capacity of the NOx trapping agent 15 is saturated, and consequently, NOx passes through the NOx trapping agent 15 to be emitted to the atmosphere. Accordingly, it is necessary that the trapped NOx in NOx trapping agent 15 is purged by released or reduced before the trapping capacity of the NOx trapping agent 15 is saturated. Therefore, it is necessary to estimate what amount of NOx is trapped to the NOx trapping agent 15. A method of estimating an amount of NOx trapped to the NOx trapping agent 15 will be described below.

As the amount (per unit time) of NOx in the exhaust gas exhausted from the engine 1 is increased, the amount (per unit time) of NOx trapped to the NOx trapping agent 15 is also increased. Because the amount (per unit time) of NOx in the exhaust gas exhausted from the engine 1 is almost determined by a rotating speed and a load of the engine 1, the amount (per unit time) of NOx trapped to the NOx trapping agent 15 is a function of the rotating speed and the load of the engine 1. Therefore, the amount (per unit time) NOAS of NOx trapped to the NOx trapping agent 15 is pre-measured as the function of the rotating speed and the load of the engine 1, and the result is pre-storaged in the ROM 37 in a form of map.

While the lean operation is continued, the estimated amount TNOA of NOx trapped to the NOx trapping agent 15 can be calculated by accumulating the NOAS every preset time period, as shown the following equation.

$$TNOA(\text{new}) = TNOA(\text{old}) + NOAS$$

In the present embodiment, before the estimated amount TNOA of NOx trapped to the NOx trapping agent 15 reaches the saturation trapping amount TNOMAX, the air-fuel ratio of the exhaust gas is temporarily changed to the stoichiometric air-fuel ratio or the rich air-fuel ratio so as to release NOx from the NOx trapping agent 15.

Since the amount (per unit time) NOAS of NOx trapped to the NOx trapping agent 15 is influenced by change of ignition timing and fuel injection timing, it is preferable that these parameters are varied. Further, the amount (per unit time) of NOx trapped to the NOx trapping agent 15 is also influenced by the amount of NOx which has been already trapped to the NOx trapping agent 15. Therefore, by setting the amount (per unit time) of NOx trapped to the NOx trapping agent 15 at the time when the amount of trapped NOx of the NOx trapping agent 15 is nearly zero to NOAS, the estimated amount TNOA of NOx trapped to the NOx trapping agent 15 may be calculated, for example, using the following equation.

$$TNOA(\text{new}) = TNOA(\text{old}) + (1 - TNOA(\text{old})/TNOAMX) \times NOAS$$

That is, the amount (per unit time) of NOx trapped to the NOx trapping agent 15 is nearly in proportion to the value of subtracting an already trapping amount from the saturation trapping amount.

Since sulfur is contained in the fuel and the lubricant of the engine 1, SOx is contained in the exhaust gas of the engine 1 though the amount of the SOx is very small. The SOx is also trapped together with NOx to the NOx trapping agent 15. However, the SOx is hardly released once it is trapped, and accordingly the amount of NOx capable of being trapped to the NOx trapping agent is gradually decreased as the amount of trapped SOx is increased. This means that the NOx trapping capacity of the NOx trapping agent 15 is deteriorated. In addition, the NOx trapping capacity of the NOx trapping agent 15 may be deteriorated by heat and various kinds of substances (lead Pd, silicon Si and so on) during the using process. Therefore, it is preferable to detect what amount of NOx can be trapped to the NOx trapping agent 15, that is, to detect the NOx saturation trapping amount TNOAMX of the NOx trapping agent. A method of detecting the NOx saturation trapping amount TNOAMX is already proposed in SS98-042. In order to make the difference between the present invention and Japanese Patent Application Laid-Open No. 2000-352309 clear, the above conventional technology will be briefly explained below.

The following is the summary of the conventional technology.

(1) An estimated amount of NOx trapped to the NOx trapping agent 15 during operation is calculated based on an operating condition of the engine 1.

(2) When detecting the saturation trapping amount TNOAMX, the lean operation time period is set so as to extend until TNOA slightly exceeds TNOAMX in order to sufficiently trap NOx up to the saturation trapping amount of the NOx trapping agent 15.

(3) During the NOx purge control after trapping NOx up to the saturation trapping amount, the time period of purging oxygen and the time period of purging NOx are separated from each other from an output of the second air-fuel ratio sensor 25 arranged downstream of the NOx trapping agent.

(4) The combustible HC and CO flowing into the NOx trapping agent 15 during the time period of purging NOx are used for reduction of NOx trapped to the NOx trapping agent 15. Further, an amount of surplus fuel is nearly in proportion to the amount of the combustible HC and CO. From the above facts, the amount of NOx trapped to the NOx trapping agent 15 is calculated based on the amount of fuel supplied during the time period of purging NOx.

The first problem of the above-described conventional technology is an error in the assumption that the acombustible HC, CO flowing into the NOx trapping agent 15 during the time period of purging NOx are used for reduction of the NOx trapped to the NOx trapping agent 15. Actually, most part of the HC, CO flowing into the NOx trapping agent (depending on the kind of the NOx trapping agent 15) is not used for reduction of the NOx trapped to the NOx trapping agent, but used for reaction with oxygen stored in the NOx trapping agent 15 and with NOx flowing into the NOx trapping agent 15 during purging. This reaction is strongly influenced by the catalyst reaction power of the NOx trapping agent 15. Further, the catalyst reaction power and the oxygen storage capacity of the NOx trapping agent 15 are varied depending on the operating condition and the effects of deterioration and so on. Therefore, the ratio of the amount of the combustible HC, CO flowing into the NOx trapping agent 15 used for reduction of the NOx trapped to the NOx trapping agent 15 to total amount of the combustible HC, CO flowing into the NOx trapping agent 15 is varied by the effects described above.

The second problem of the above-described conventional technology is an error in the assumption that the surplus amount of fuel is nearly in proportion to the amount of the combustible HC, CO. The air-fuel ratio during the NOx purge control is generally controlled to a value 10 to 20% richer than the stoichiometric air-fuel ratio. The amount corresponding to the value 10 to 20% richer than the stoichiometric air-fuel ratio is the surplus amount of fuel. However, in general, a feedback correction value at the time when feedback control is performed under the stoichiometric air-fuel ratio is learned, and during the NOx purge control, the air-fuel ratio is controlled by open control based on the learned value. Therefore, an error occurs in the air-fuel ratio during the NOx purge control due to the error in learning and the difference in operating conditions at learning.

Further, in the case where a catalyst or the like having an oxygen storage capacity exists at a position upstream of the NOx trapping agent 15, the oxygen in the catalyst is released when the operation mode is switched from the lean operation to the NOx purge control, and accordingly part of the combustible HC, CO exhausted from the engine 1 reacts with the oxygen. That is, part of the combustible HC, CO has been used before flowing into the NOx trapping agent 15. Furthermore, in the case where an agent capable of trapping and releasing HC and CO exists at a position upstream of the NOx trapping agent 15, the relationship between the surplus amount of fuel and the amount of combustible HC, CO is varied. In these cases, the oxygen storage capacity and the power of trapping and releasing HC and CO are also varied depending on the operating condition and the effects of deterioration of the catalyst and the agent.

From the above-mentioned reason, there occurs variation in the relationship between the surplus amount of fuel and the amount of combustible HC, CO.

The third problem of the above-described conventional technology is an accuracy in separating the time period of releasing oxygen and the time period of releasing or reducing(purging) NOx from each other during the NOx purge control. In the conventional technology, it is premised that oxygen is released in the early period of the NOx purge control and then purge of NOx is started after completion of the release of oxygen. However, in the strict sense, purge of NOx is started during releasing oxygen. Because the purging rate of NOx is influenced by the effect of the concentration of oxygen in the exhaust gas, the purging rate of NOx is influenced by the releasing rate of oxygen, and the releasing rate of oxygen is influenced by the temperature of the exhaust gas. Further, in the case where a catalyst or the like having an oxygen storage capacity exists at a position upstream of the NOx trapping agent 15, the oxygen in the catalyst is released when the operation mode is switched from the lean operation to the NOx purge control. At that time, the releasing rate of oxygen and the releasing amount of oxygen are also influenced by the operating conditions such as the exhaust gas temperature and so on. That is, there is a possibility that the detected amount of trapped NOx is deviated by the effect of the operating conditions such as the exhaust gas temperature and so on. Further, in the case where a catalyst or the like having an oxygen storage capacity exists at a position upstream of the NOx trapping agent 15 and the completion of purging NOx is detected using an air-fuel ratio sensor arranged at a position downstream of the catalyst, the output of the air-fuel ratio sensor is influenced by the effect of the oxygen released from the catalyst or the like having an oxygen storage capacity exists at the position upstream of the NOx trapping agent 15. Therefore, there is a possibility that the detected amount of trapped NOx is deviated by the effect of deterioration of the oxygen storage capacity of the catalyst or the like.

The third problem described above is a problem not only in the above-described conventional technology but also in the other conventional technologies. For example, in a technology in which the oxygen storage capacity is detected using the air-fuel ratio sensor 25 at the position downstream of the NOx trapping agent when the amount of trapped NOx is nearly zero, there is a possibility that the variations in detection of the NOx trapping amount becomes larger due to the operating condition such as exhaust gas temperature and so on because the oxygen storage capacity is separately detected under a different operating condition.

Among the first to third problems described above, the variations caused by the operating conditions such as the exhaust gas temperature can be suppressed to a certain degree by limiting the operating region or by measuring and limiting the exhaust gas temperature range when the amount of trapped NOx is detected. However, the conventional technology can not exclude the effects of deterioration in the performance as a catalyst of the NOx trapping agent 15 and in the performances of the catalysts in the position upstream and downstream of the NOx trapping agent and the effect of variations of the controlled air-fuel ratio during the NOx purge control.

In the conventional technology in which an absolute value of the amount of trapped NOx is detected, the factor of the above-mentioned variations directly influences the detected value of the amount of trapped NOx. Therefore, there is a possibility that the saturation trapping amount of the NOx trapping agent 15 is erroneously judged to be large while it is actually small, or that the saturation trapping amount of the NOx trapping agent 15 is erroneously judged to be small while it is actually large. As the result, there is a possibility that deterioration of the NOx trapping agent is misjudged, and accordingly the NOx trapping agent is left in the deteriorated state to emit NOx to the atmosphere, or that the NOx trapping agent is erroneously judged to be deteriorated while it is not deteriorated to generate a warning.

Further, the fourth problem of the conventional technology is that in order to detect the saturation trapping amount of the NOx trapping agent 15, it is necessary to trap an amount of NOx more than an estimated amount to be saturated. Because of the property of the NOx trapping agent, as the amount of trapped NOx approaches to the saturation trapping amount, the NOx trapping agent can not trap NOx sufficiently to increase the amount of NOx flowing downstream. Further, once the amount of trapped NOx reaches the saturation trapping amount, almost all of the NOx flowing into the NOx trapping agent flows downstream. Therefore, when the saturation trapping amount is detected through the conventional technology, the amount of NOx emitted to the atmosphere is increased.

An object of the present invention is to accurately detect the saturation trapping amount (to detect whether or not there is an margin to the saturation trapping amount) by suppressing the variations in detection of the NOx trapping amount caused by these variation factors. Further, when the saturation trapping amount is detected, the amount of NOx emitted to the atmosphere is suppressed to increase.

An essential part of the present invention is as follows. The present invention does not intend to detect the absolute value of the NOx trapping amount. In order to change the amount of NOx trapped to the NOx trapping agent 15, the operation parameter, for example, the lean operating time period is changed, and at that time, change in an output of the specified component detecting means arranged at a position downstream of the NOx trapping agent 15, for example, the second air-fuel ratio sensor 25 is detected, and then a characteristic relating to the amount of trapped NOx, for example, change in the elapsing time from starting the NOx purge control to the time when the output of the second air-fuel ratio sensor 25 reaches a predetermined value is detected. For example, if the output does not change more than the predetermined value within the detected elapsing time, it is judged that an amount of NOx trapped to the NOx trapping agent 15 already reaches an amount near the saturation trapping amount, and the NOx trapping ability is already decreased. If the output changes more than the predetermined value within the detected elapsing time, it is judged that the NOx trapping agent 15 still has an margin in the amount of trapping NOx to the saturation trapping amount, and accordingly the trapping ability is not decreased yet. In this case, before and after changing the operation parameter in order to change the NOx amount trapped to the NOx trapping agent 15, the causes other than the operating condition such as the exhaust gas temperature among the variation factors of the above-mentioned problems in the conventional technology can be minimized. In other words, the effects of deterioration of the performance of the NOx trapping agent 15 as a catalyst and the performance of the catalysts upstream and downstream of the NOx trapping agent, and the effect of the variation in the control air-fuel ratio during the NOx purge control can be minimized.

Since the present invention judges that there is on margin in the Nox trapping amount to saturation trapping amount of NOx, that means it judges whether or not the trapping ability starts to decrease, there is no possibility that the trapping amount is erroneously judged to not reach the saturation trapping amount while it actually reach the saturation trapping amount, nor that the trapping amount is erroneously judged to reach the saturation trapping amount while it does actually not reach the margin.

Further, since it is not necessary to trap NOx up to the saturation trapping amount when the margin of the amount of trapping NOx to the saturation amount of trapped NOx is detected, the amount of NOx emitted to the atmosphere is suppressed to increase when the saturation trapping amount is detected.

Although the conventional technology is directly influenced by the variation in the exhaust gas temperature because the absolute value of the saturation trapping amount is detected, the present invention is hardly influenced by the variation in the exhaust gas temperature because it is judged whether or not there is margin in the NOx trapping amount.

Similarly, the present invention is hardly influenced by the variation in the output of the second air-fuel ratio sensor 25 arranged at the position downstream of the NOx trapping agent.

As the variable operation parameters in order to change the amount of NOx trapped to the NOx trapping agent 15, in addition to the lean operation time period there are ignition timing, fuel injection timing, EGR ratio, air-fuel ratio and so on which are operation parameters capable of changing the NOx amount exhausted from the engine 1 during lean operation. The amount of NOx trapped to the NOx trapping agent 15 can be changed by changing these parameters solely or in combination.

Further, as the specified component detecting means arranged downstream of the NOx trapping agent 15, a NOx, HC or CO concentration detecting means may be employed instead of the air-fuel ratio sensor for measuring an oxygen concentration. After completion of releasing and/or reducing of NOx trapped to the NOx trapping agent 15, an amount of NOx at the downstream position is decreased and an amount of HC, CO is increased. Therefore, the completion of releasing and reducing of NOx trapped to the NOx trapping agent 15 can be judged by detecting these characteristics.

Description will be made below on the methods in accordance with the present invention of judging whether or not there is an margin in the NOx trapping amount.

Initially, description will be made below on the method of detecting a characteristic relating to the NOx trapping amount from an output of the second air-fuel ratio sensor 25 arranged downstream of the NOx trapping agent 15 when NOx is purged from the NOx trapping agent 15.

Figure 5:
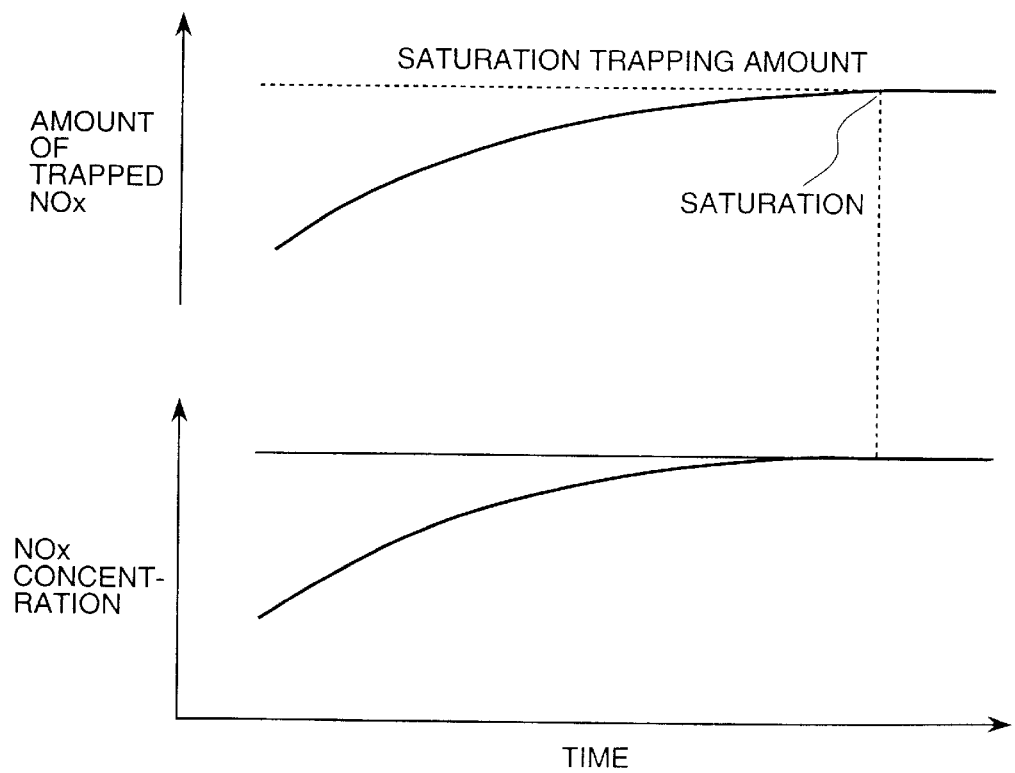
FIG. 5 is a graph explaining the relationship between lean operating time and amount of trapped NOx, concentration of NOx.

The NOx exhausted from the engine 1 during the lean operation is trapped to the NOx trapping agent 15. FIG. 5 shows an example of change in the amount of NOx trapped in the NOx trapping agent 15 during the lean operation and change in NOx in the exhaust gas at upstream and downstream positions of the NOx trapping agent 15. After trapping the NOx up to the saturation trapping amount by continuing the lean operation, the NOx flowing into the NOx trapping agent 15 directly flows downstream. Therefore, in order to release and/or reduce the trapped NOx, the air-fuel ratio of the exhaust gas is temporarily changed to the stoichiometric air-fuel ratio or the rich air-fuel ratio at an appropriate timing (NOx purge control). When the NOx purge control is performed, an exhausted gas containing the combustible HC, Co and having a low oxygen concentration is exhausted from the engine 1.

Figure 6:
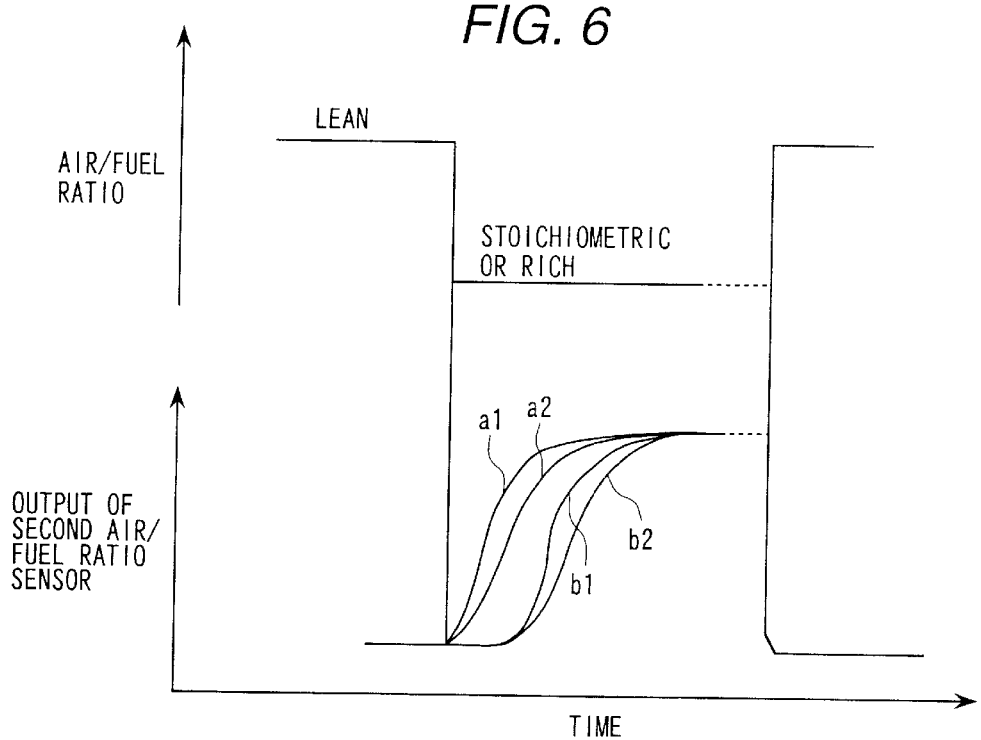
FIG. 6 is a graph explaining the relationship between output waveform of an air-fuel ratio sensor downstream of an NOx trapping agent and amount of stored oxygen, amount of trapped NOx during NOx purge control.

At that time, if the NOx trapping agent 15 has an oxygen storage capacity or a catalyst having an oxygen storage capacity is arranged upstream of the NOx trapping agent 15, the storaged oxygen is initially released. As the release is progressed to lower the oxygen concentration in the NOx trapping agent 15, the trapped NOx is released and at the same time is reduced by the combustible HC, CO and the like, otherwise the trapped NOx is contact-reduced by the combustible HC, CO and the like. FIG. 6 shows an example of output waveforms of the second air-fuel ratio sensor 25 during the NOx purge control. The curves a1 and a2 and the curves b1 and b2 show the output waveforms of the second air-fuel ratio sensor 25 when the NOx trapping agent 15 different in the oxygen storage amount (oxygen storage capacity) is used. The curves a1 and a2 show the cases of the NOx trapping agent 15 having a small oxygen storage capacity, and the curves b1 and b2 show the cases of the NOx trapping agent 15 having a large oxygen storage capacity. Since oxygen is fully stored up to the oxygen storage capacity in a short time by performing the lean operation, it may be considered in this case that the oxygen storage amount is equal to the oxygen storage capacity. Each of the curves a1 and b1 shows the output waveform of the second air-fuel ratio sensor 25 in the case where the NOx trapping agent 15 has a smaller amount of trapped NOx, and each of the curves a2 and b2 shows the output waveform in the case where the NOx trapping agent 15 has a larger amount of trapped NOx.

Figure 7:
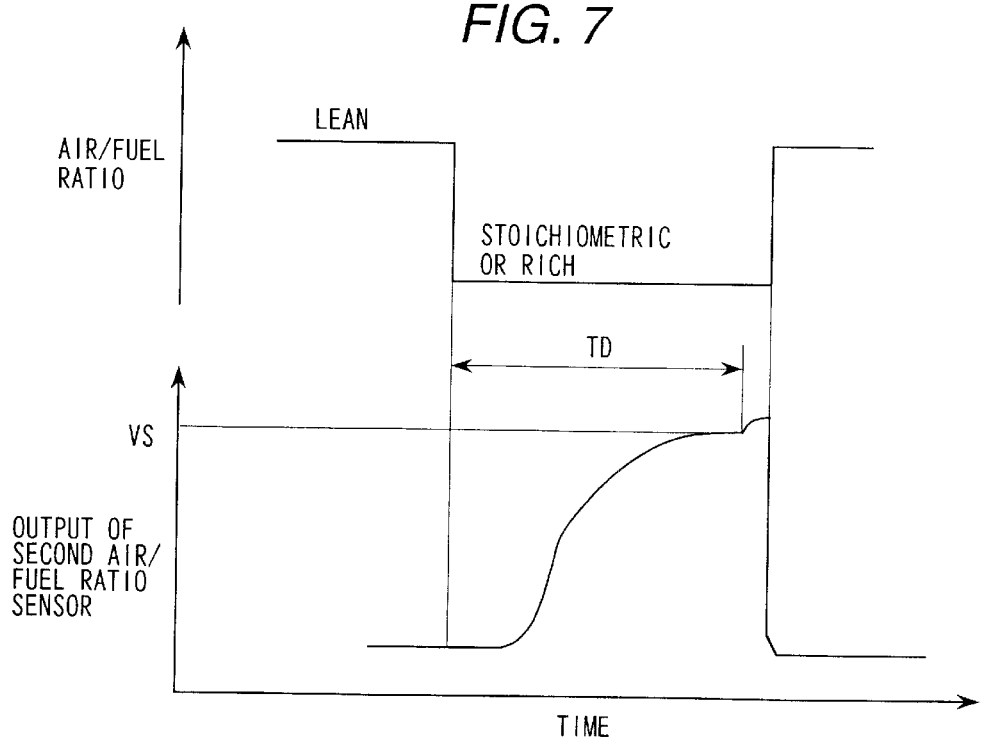
FIG. 7 is a graph explaining a method of judging the amount of trapped NOx using the output waveform of an air-fuel ratio sensor downstream of an NOx trapping agent during NOx purge control.

An appropriate threshold VS is set as shown in FIG. 7, and the time period from starting the NOx purge control to the time when the output of the second air-fuel ratio sensor 25 crosses with the threshold VS is defined as TD.

By setting the threshold VS to approximately 0.8 V in the case of the NOx trapping agent used for an experiment, it has been checked from the experiment that the timing of the output of the second air-fuel ratio sensor 25 crossing with the threshold VS is the completion timing of purging NOx trapped to the NOx trapping agent 15. Therefore, the purge control is ended after the output of the second air-fuel ratio sensor 25 crosses with the threshold VS.

Figure 8:
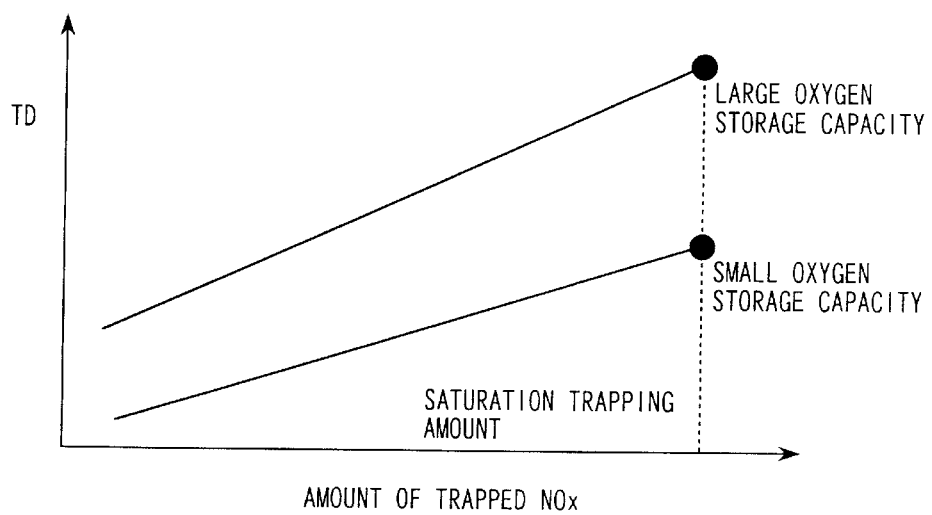
FIG. 8 is a graph showing the relationship between TD and amount of trapped NOx, and the effect of the amount of trapped oxygen.

FIG. 8 shows an example of the relationships between the amount of trapped NOx and the time TD under the same operating condition (exhaust gas temperature, rotating speed, load) when the NOx trapping agent 15 or the cleaning performance of the catalyst arranged at an upstream position is different. It can be understood from the graph that there is a linear relation between the time TD and the amount of trapped NOx. The relationship between the oxygen storage capacity and the gradient of the straight line varies depending on the kind of the catalyst, but there seems to exist a tendency that the gradient becomes smaller as the oxygen storage capacity is larger. Actually, there is a few cases that only the oxygen storage capacity is different, and the cleaning performance to be described below is also different together with the oxygen storage capacity. As described above, since the time TD varies depending on the magnitude of the oxygen storage capacity, the NOx trapping amount can not be uniquely detected from the time TD.

Figure 9:
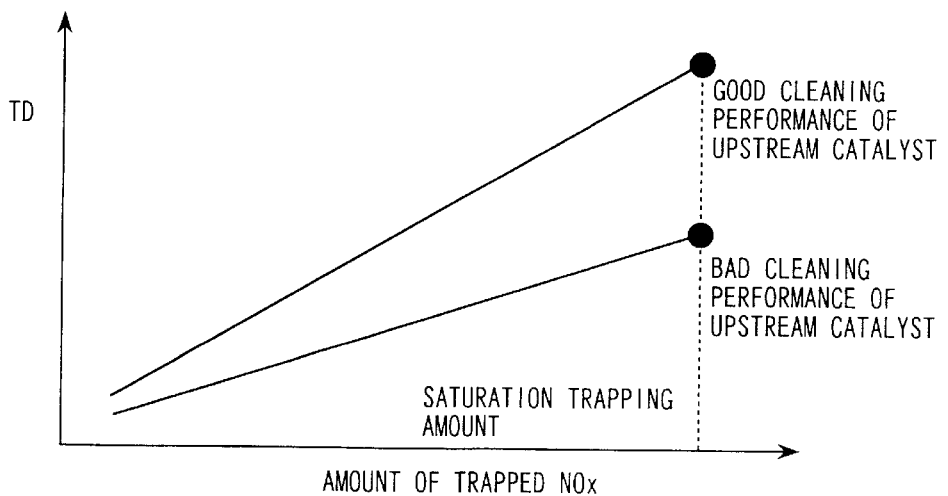
FIG. 9 is a graph showing the relationship between TD and amount of trapped NOx, and the effect of cleaning performance of a catalyst arranged upstream of the NOx trapping agent.

In the present invention, whether or not the trapped amount of NOx trapped to the NOx trapping agent 15 has an margin to the saturation trapping amount is detected by the change in the waveform, for example, the change in the time TD of the second air-fuel ratio sensor 25 arranged downstream of the NOx trapping agent 15 when the operating condition parameter, for example, the lean operation time period is changed in order to change the amount of trapped NOx. Therefore, the detected saturation trapping amount is hardly influenced by the variations described by FIG. 8 and FIG. 9.

Further, in the present invention, even if the threshold VS to the second air-fuel ratio sensor 25 is not strictly set, the detected saturation trapping amount is hardly influenced by the setting of the threshold VS since the margin of the amount of trapped NOx is detected by the difference of the time TD. Similarly, even if the output of the second air-fuel ratio sensor 25 is changed due to deterioration (level, responsivity), the detected saturation trapping amount is hardly influenced by the deterioration.

Figure 10:
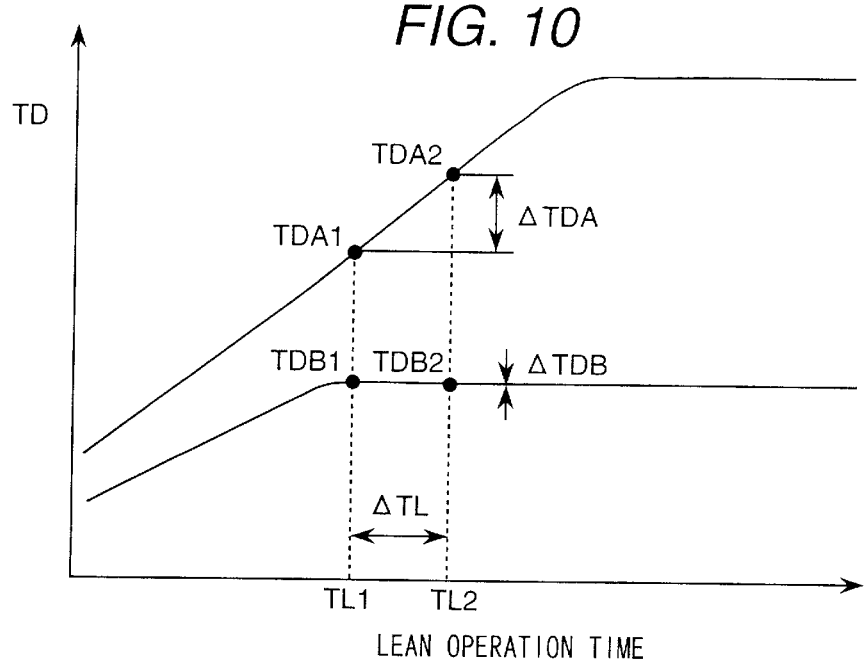
FIG. 10 is a graph explaining a method of judging NOx trapping performance using change of TD when lean operating time is changed.

FIG. 10 shows the relationship between the lean operation time period and the time TD. The curve A shows an example for an NOx trapping agent A which is not deteriorated, and the curve B shows an example for an NOx trapping agent B which is deteriorated. The absolute value of the time TD is changed by the variations of the oxygen storage capacity, the cleaning performance of the catalyst and so on described above. However, the NOx trapping amount is increased with the lean operation time until it reaches the saturation trapping amount even if these deviation factors are produced, and once it is saturated, the NOx trapping amount is not changed even if the lea operation time is extended.

We let the time TD detected during the NOx purge control performed after the lean operation time period of TL1 be TDA1, TDB1, and the time TD detected during the NOx purge control performed after the lean operation time period of TL2 (=TL1+ΔTL) be TDA2, TDB2.

We let $$\Delta TD = TD2 - TD1, \text{ and}$$

subscripts A, B are added corresponding to the NOx trapping agents A, B. Further, we let a judged value based on ΔTL, TL1 and the operating condition be ΔTDSL. Since the NOx trapping agent A is not saturated yet at the lean operation time TL2 and accordingly ΔTDA≧ΔTDSL, it is judged that there is an margin in the NOx trapping amount to the saturation trapping amount. Since the NOx trapping agent B is already saturated at the lean operation time TL2 and accordingly ΔTDA (≈0)≦ΔTDSL, it is judged that there is no margin in the NOx trapping amount to the saturation trapping amount. As described above, it can be judge by ΔTD whether or not the NOx trapping agent 15 traps NOx up to an amount near the saturation trapping amount. That is, it can be judged by ΔTD whether or the Nox trapping agent 15 traps Nox up to the amount near the saturation trapping amount. Thus it can be judged by ΔTD whether or not the NOx trapping ability starts to decrease.

Description will be made below on a method of quantitatively calculate the amount of trapped NOx trapped during the time interval ΔTD.

Since the NOx trapped to the NOx trapping agent 15 during the time interval ΔTL is purged during the time interval ΔTD, the amount of NOx trapped to the NOx trapping agent 15 during the time interval ΔTL can be known by calculating the amount of NOx purge during the time interval ΔTD.

While NOx is being released from the NOx trapping agent 15, the combustible HC, CO contained in the exhaust gas are used for reducing the NOx. Therefore, the amount of NOx purged from the NOx trapping agent 15 per unit time NODS is in proportion to the amount of surplus fuel, that is, the amount of the combustible HC, CO supplied per unit time.

The amount of surplus fuel supplied per unit time Qfex is expressed by the following equation.

$$Qfex = k1 \cdot Ti \cdot (Kr - 1)/Kr \cdot Ne$$
$$= k1 \cdot K \cdot Qa \cdot (Kr - 1),$$

where k1 is a proportional constant, and the others are the values explained by the equation of Ti. Since the amount of NOx purged from the NOx trapping agent 15 per unit time NODS is in proportion to Qfex, NODS can be expressed by the following equation by letting a proportional constant be k2.

$$NODS = k2 \cdot Qfex$$
$$= k \cdot Qa \cdot (Kr - 1),$$

where k=k1·k2.

Although it depends on the kind of the NOx trapping agent 15, there is a possibility that the combustible HC, Co are supplied exceeding the reduction reaction rate of NOx trapped to the NOx trapping agent 15 if the air-fuel ratio correction coefficient Kr at the purge control is excessively large (the air-fuel ratio is excessively rich). In that case, part of the combustible HC, CO directly pass through the NOx trapping agent 15, which produces a calculation error in the amount of trapped NOx. On the other hand, Kr during normal NOx purge control is sometimes set to a slightly larger value (for example, Kr>1.1) in order to accelerate purging of NOx. Therefore, it is preferable that Kr during the NOx purge control for obtaining the amount of trapped NOx is set to a value (for example, 1>Kr>1.1) different from the value during the normal NOx purge control.

As described above, the amount of NOx trapped to the NOx trapping agent 15 during time interval ΔTD performing the NOx purge control can be calculated by calculating the total sum ΔTNOD of NODS during ΔTD, that is, can be calculated by the following equation.

$$\Delta TNOD = \sum NODS \text{ (the total sum during } \Delta TD\text{)}$$
$$= k \cdot \sum \{Qa \cdot (Kr - 1)\} \text{ (the total sum during } \Delta TD\text{)},$$

In the following equation of calculating the amount of NOx released from the NOx trapping agent 15, in most cases the air-fuel ratio correction coefficient Kr is actually a fixed value (for example, a plurality of fixed values are preset for individual operation modes).

$$NODS = k \cdot Qa \cdot (Kr-1)$$

Therefore, the total sum ΔTNOD of NODS during ΔTD is in proportion to the total sum of Qa during ΔTD. From the fact, TNOD may be calculated from the following equation.

$$\Delta TNOD = k' \cdot Qave \cdot Kr \cdot \Delta TD,$$

where k' is a proportional constant, and Qave is the average value of Qa during ΔTD.

However, the proportional constants k, k' are varied by the effects of the NOx trapping agent 15 and the cleaning performance of the catalyst arranged upstream of the NOx trapping agent 15, as described above. Further, Kr has an error in the absolute value of ΔTNOD calculated through the above-mentioned method. However, the absolute value of ΔTNOD is a value of which the effects of Qa as the operating condition and Kr as the control value are corrected, it is preferable that the amount of NOx trapped to the NOx trapping agent 15 is evaluated using ΔTNOD rather than using ΔTD. Further, in regard to the separately detectable factors among the variation factors described above, it is preferable that the proportional constants k, k' are corrected corresponding to the detected values.

Description will be made below on the processes of the NOx purge control and the process of detecting the NOx trapping amount under an actual operating state of the engine.

Figure 11:
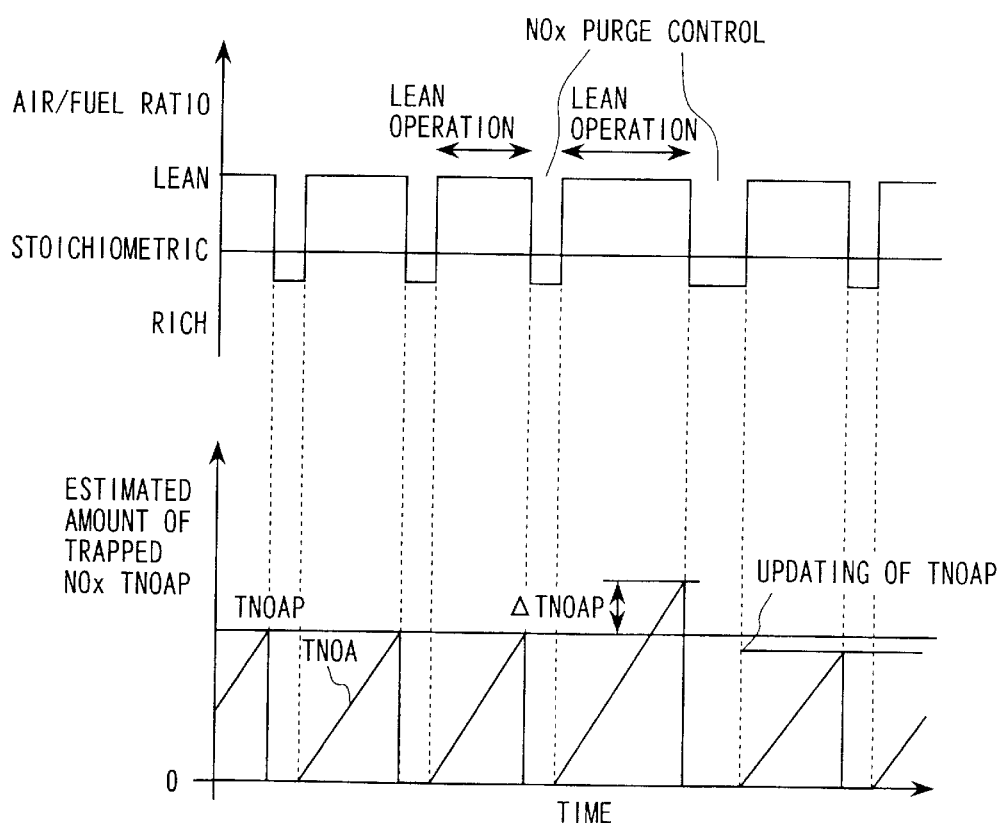
FIG. 11 is a graph explaining the NOx purge control and timing of deterioration judgment.

Since the operating condition in the actual operating state is changed every moment, it is preferable to perform the NOx purge control when the estimated amount of NOx trapped to the NOx trapping agent 15 becomes a value TNOAP smaller than the saturated trapping amount TNOAMX rather than to periodically perform the NOx purge control when the lean operation time period elapses a preset time. Therefore, as shown in FIG. 11, the normal NOx purge control is performed when the estimated amount of NOx trapped to the NOx trapping agent 15 becomes a value TNOAP smaller than the saturated trapping amount TNOAMX, and the NOx purge control only for detecting the NOx trapped amount ΔTNOD is performed when TNOA becomes a value TNOAP+ΔTNOAP slightly larger than TNOAP (or a value TNOAP−ΔTNOAP slightly smaller than TNOAP).

If the operating condition is not varied, that the lean operation is continued until TNOA reaches the preset value is equivalent to that the lean operation time period is constant. Instead of performing the NOx purge control when TNOA becomes TNOAP, the lean operation time period may be varied corresponding to the operating condition.

As the NOx purge control is performed, a detected value of the NOx trapping amount ΔTNOD is calculated through the method described above. A judgment threshold ΔTNODSL is obtained, for example, by searching of a table of TNOAP. If ΔTNOD>ΔTNODSL, it is judged that the NOx trapping amount of the NOx trapping agent 15 has [an] a margin. If ΔTNOD≦ΔTNODSL, it is judged that the NOx trapping amount of the NOx trapping agent 15 has no margin.

If it is judged that the NOx trapping amount of the NOx trapping agent 15 has little margin, that is, it is judged that the NOx trapping ability starts to decrease, it is judged, for example, that the NOx trapping agent 15 is deteriorated. Otherwise, TNOAP is updated to a slightly smaller value (shortening the lean operation time period), and TNOAP is gradually updated if it is further judged that the NOx trapping amount of the NOx trapping agent 15 has no margin. If TNOAP becomes smaller than a preset value, it is judged that the NOx trapping agent 15 is deteriorated.

If it is judged that the NOx trapping amount of the NOx trapping agent 15 has an margin, that is, it is judged that the NOx trapping ability does not start to decrease, TNOAP is not updated. Otherwise, TNOAP may be updated to a slightly larger value (extending the lean operation time period).

It is obvious from the above description that the NOx purge control can be performed by using the lean operation time period instead of TNOA and using an appropriate time period instead of TNOAP.

If it is judged from the above-mentioned method that the NOx trapping agent is deteriorated, SOx depoisoning recovery control is performed. After that, if it is further judged that the NOx trapping agent is deteriorated, the NOx trapping agent is judged to be deteriorated to perform storage of the code expressing deterioration of the NOx catalyst and/or warning to the driver by switching-on the warning light. Otherwise, if it is judged that the NOx trapping agent is deteriorated, storage of the code expressing deterioration of the NOx catalyst and/or warning to the driver by switching-on the warning light may be performed without performing the SOx depoisoning recovery control.

Further, if it is judged that the NOx trapping agent is deteriorated, it is preferable that the lean operation is limited in order to prevent NOx from being emitted to the atmosphere.

The SOx depoisoning recovery control can be performed by continuing operation for a preset time period by increasing the temperature of the NOx trapping agent 15 up to a preset temperature, for example, up to 600° C. or higher and setting the air-fuel ratio to the rich air-fuel ratio.

In the above description, the method of actively varying the amount of NOx trapped to the NOx trapping agent 15 has been explained. The other methods will be described below. Under an actual operating state, there is a timing to make the air-fuel ratio to rich such as accelerating the vehicle, and the NOx purge control is sometimes performed using this timing. In this case, the NOx purge control is sometimes performed before the estimated NOx amount TNOA becomes TNOAP. Therefore, the difference between the TNOA when the NOx purge control is performed and the TNOA when the preceding (or the following) NOx purge control is performed expresses change in the amount of NOx trapped to the NOx trapping agent 15. The margin of the NOx trapping amount can be detected based on ΔTD and ΔTNOD at that time.

Since the estimated NOx trapping amount TNOA is an estimated value, it includes an error. The causes of the error are, for example, a deviation of an actual value from a map value of the preset amount of NOx (exhausted from the engine 1) trapped to the NOx trapping agent described above, deterioration of the NOx trapping performance (trapping rate) of the NOx trapping agent 15 and so on.

Therefore, in the case of judging that no margin exist in the NOx trapping amount; gradually updating TNOAP; and judging that the NOx trapping agent 15 is deteriorated when the TNOAP becomes smaller than the preset value, there is a possibility that it is erroneously judged that the NOx trapping agent 15 is deteriorated even if an abnormality occurs in the engine to increase the NOx exhausting amount. Therefore, it is preferable (1) that the judgment on deterioration of the NOx trapping agent 15 is prohibited when there is an abnormality in the engine 1 or in the fuel ignition system parts, and/or (2) that in the above, it is judged that an abnormality occurs in the NOx trapping agent 15 or in the engine 1 when TNOAP is gradually updated and the TNOAP becomes smaller than a preset value, and storage of the corresponding code and/or a warning to the driver by switching-on the warning light are performed.

Further, comparing the change ΔTNOA in the estimated NOx trapping amount TNOA with the change ΔTNOD in the detected NOx trapping amount, ΔTNOD is generally high in the accuracy (particularly when the NOx trapping amount is small). Therefore, it is possible that ΔTNOA is corrected using ΔTNOD, or that the engine 1 is judged to have an abnormality when ΔTNOD is large compared with ΔTNOA.

It is preferable that the judgments on the detection of the change ΔTNOD in the NOx trapping amount and the deterioration of the NOx trapping agent 15 described above are performed only when a predetermined condition is satisfied, for example, when the temperature of the NOx trapping agent 15 and the operating state are within a predetermined range. The reason is as follows.

Since the NOx trapping amount of the NOx trapping agent 15 is strongly influenced by the temperature of the NOx trapping agent 15, a condition in regard to the temperature of the NOx trapping agent 15 is set. The NOx saturation trapping amount TNOAMX is decreased when the temperature of the NOx trapping agent 15 is too low or too high. Therefore, the change ΔTNOD in the NOx trapping amount becomes a smaller value in such a state, and there is a possibility to erroneously judge that the NOx trapping agent 15 is deteriorated. In order to improve the detection accuracy of the change ΔTNOD, it is preferable that detection of the change ΔTNOD in the NOx trapping amount is discontinued or prohibited when the fluctuation in the temperature is large. In the limitations in regard to the temperature, the temperature of the NOx trapping agent sobtained from direct measurement or the temperature of the exhaust gas obtained from direct measurement or the temperature estimated from the operation state may be used.

The limitation in regard to the operating condition may be used as an alternative of the limitation in regard to the temperature described above. Further, in order to improve the detection accuracy of the change ΔTNOD, it is preferable that detection of the change ΔTNOD in the NOx trapping amount is discontinued or prohibited when the change in the operating state is large. Further, since the amount of NOx flowing into the NOx trapping agent 15 is varied when the combustion state of the engine 1 is not stable, an operation region of stable combustion is set as a condition.

Further, when there is an abnormality in the engine 1 or in the fuel ignition system parts, it is preferable that In order to improve the detection accuracy of the change ΔTNOD, it is preferable that detection of the change ΔTNOD in the NOx trapping amount is discontinued or prohibited when the fluctuation in the temperature is large. Furthermore, when the oxygen storage capacity of the NOx trapping agent 15, or the oxygen storage capacity or the exhaust gas cleaning performance of the agent such as the catalyst arranged upstream or downstream of the NOx trapping agent is deteriorated, it is preferable that detection of the change ΔTNOD in the NOx trapping amount is discontinued or prohibited.

An embodiment will be described below, referring to flowcharts.

Figure 12:
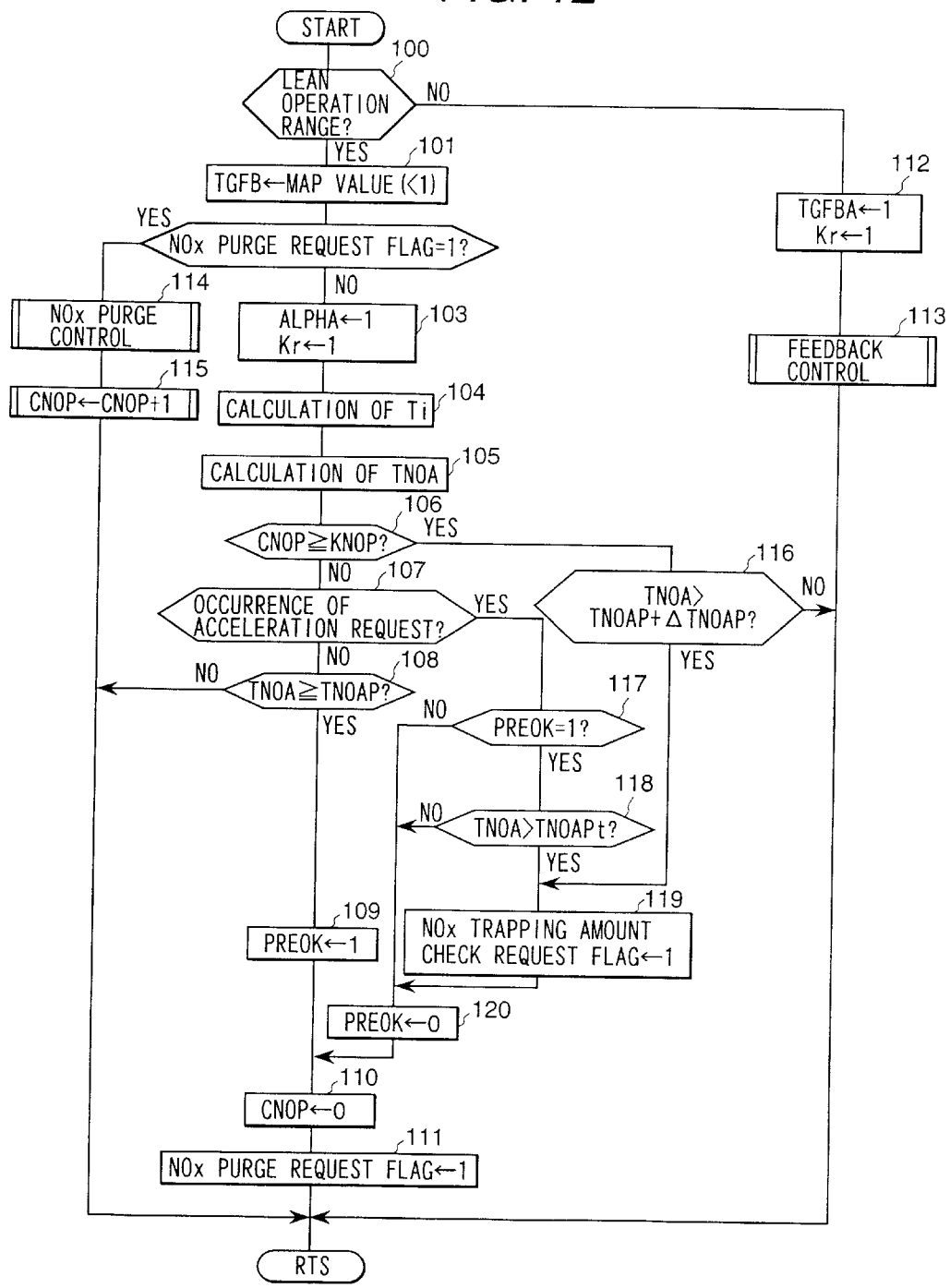
FIG. 12 is a flowchart explaining the fuel control process.

FIG. 12 is a flowchart showing an embodiment of an air-fuel ratio control process. This control is started ever predetermined time period (for example, 20 ms) from a main routine, not shown.

Initially, in Step 100, it is checked whether or not the operation state is in the lean operation range. Therein, it is checked whether or not the load and the rotating speed of the engine 1, the cooling water temperature, the speed of the vehicle and so on are within the predetermined range. If it is judged that the operation state is not in the lean operation range, the processing proceeds to Step 112 to set TGFBA to 1, and Kr to 1. That is, the stoichiometric operation is performed. Next, the processing proceeds to Step 113 to perform feedback control of the air-fuel ratio based on an output of the first air-fuel ratio sensor 14.

If it is judged in Step 100 that the operation state is in the lean operation range, the processing proceeds to Step 101 to search a corresponding value (<1) from the map of rotating speed and load of the engine 1 shown in FIG. 4 and to set the corresponding value to the target equivalent ratio TGFBA. Next, the processing proceeds to Step 102. If NOx purge request judgment flag, to be described later, is set (=1), NOx purge control subroutine (to be described later) of Step 114 is executed, and then counter CNOP for normal NOx purge control times is counted up by 1 (one) in Step 115 to complete the control flow. If NOx purge request judgment flag is not set, the processing proceeds to Step 103 to set the feedback coefficient ALPHA to 1, and the air-fuel ratio correction coefficient during the NOx purge control Kr to 1. Next, the processing proceeds to Step 104 to calculate a fuel injection time period Ti using the following equation.

$$Ti = K \cdot (Qa/Ne) \cdot TGFBA \cdot ALPHA \cdot Kr$$
$$= K \cdot (Qa/Ne) \cdot TGFBA$$

That is, the lean operation corresponding to the target equivalent ratio TGFBA is performed.

In the next Step 105, the estimated NOx trapping amount TNOA is calculated during continuing the lean operation by accumulating using the following equation.

$$TNOA(\text{new}) = TNOA(\text{old}) + NOAS,$$

where NOAS is calculated from a map preset corresponding to the operating state of the engine 1 at that time.

In the next Step 106, it is checked whether or not the counter for normal NOx purge control times CNOP is larger than a judgment value KNOP. If the counter for normal NOx purge control times CNOP is larger than a judgment value KNOP, the processing proceeds to Step 116 by judging that the judgment of the NOx trapping amount of the NOx trapping agent 15 is necessary. Therein, it is checked whether or not the estimated NOx trapping amount TNOA exceeds (TNOAP+ΔTNOAP). If the estimated NOx trapping amount TNOA exceeds (TNOAP+ΔTNOAP), the NOx trapping amount judgment request flag is set (=1) in Step 119, and PREOK is cleared (=0) in Step 120.

The PREOK is a flag expressing whether or not the detection of the NOx trapping amount TNOD during the NOx purge control preceding by one time is normally performed when the NOx trapping amount judgment is performed. Further, the counter for normal NOx purge control times CNOP is cleared in Step 110, and the NOx purge request flag is set (=1) in Step 111. In Step 116, if the estimated NOx trapping amount TNOA exceeds (TNOAP+ΔTNOAP), the control flow is completed.

In Step 106, if CNOP is smaller than the judgment value KNOP, it is checked in Step 107 whether or not there occurs an acceleration request or the like that the air-fuel ratio is changed to the stoichiometric air-fuel ratio or the rich air-fuel ratio. If the air-fuel ratio needs to be changed to the stoichiometric air-fuel ratio or the rich air-fuel ratio based on such an acceleration request or change of an operating condition such as evaporation gas purge, NOx purge is performed even if the TONA does not reach TONAP. If there is the acceleration request or the like, it is checked in Step 117 whether or not PREOK=1, and in Step 118 whether or not TNOA is larger than a preset value TNOAPt. If the both are satisfied, by judging that the judgment of the NOx trapping amount can be executed, the processing proceeds to Step 119. After that, the same processes as the case of proceeding from Step 106 to Steps 116, 119 are performed. If either of the conditions in Step 117 and Step 118 is not satisfied, by judging that the judgment of the NOx trapping amount can not be executed, the processing proceeds to Step 120 without setting the NOx trapping amount judgment request flag. After clearing PREOK in Step 120 and clearing CNOP in Step 110, the NOx purge request flag is set in Step 111.

If the acceleration request or the like does not occur in Step 107, the processing proceeds to Step 108 to check a starting condition of the normal NOx purge control. Therein, it is checked whether or not the estimated NOx trapping amount TNOA exceeds the NOx purge threshold TNOAP. If exceeds, PREOK is set (=1) in Step 109, CNOP is cleared (=0) in Step 110 and the NOx purge request flag is set (=1) in Step 111. If TNOA does not exceed TNOAP, this control flow is completed.

By the above processes, the NOx trapping amount judgment is performed every KNOP times of performing the normal NOx purge control, or when an acceleration request occurs, and the NOx trapping amount in this time is larger than the preset value and the detection of the NOx trapping amount TNOD during the preceding NOx purge control is judged to be normally performed.

Figure 13:
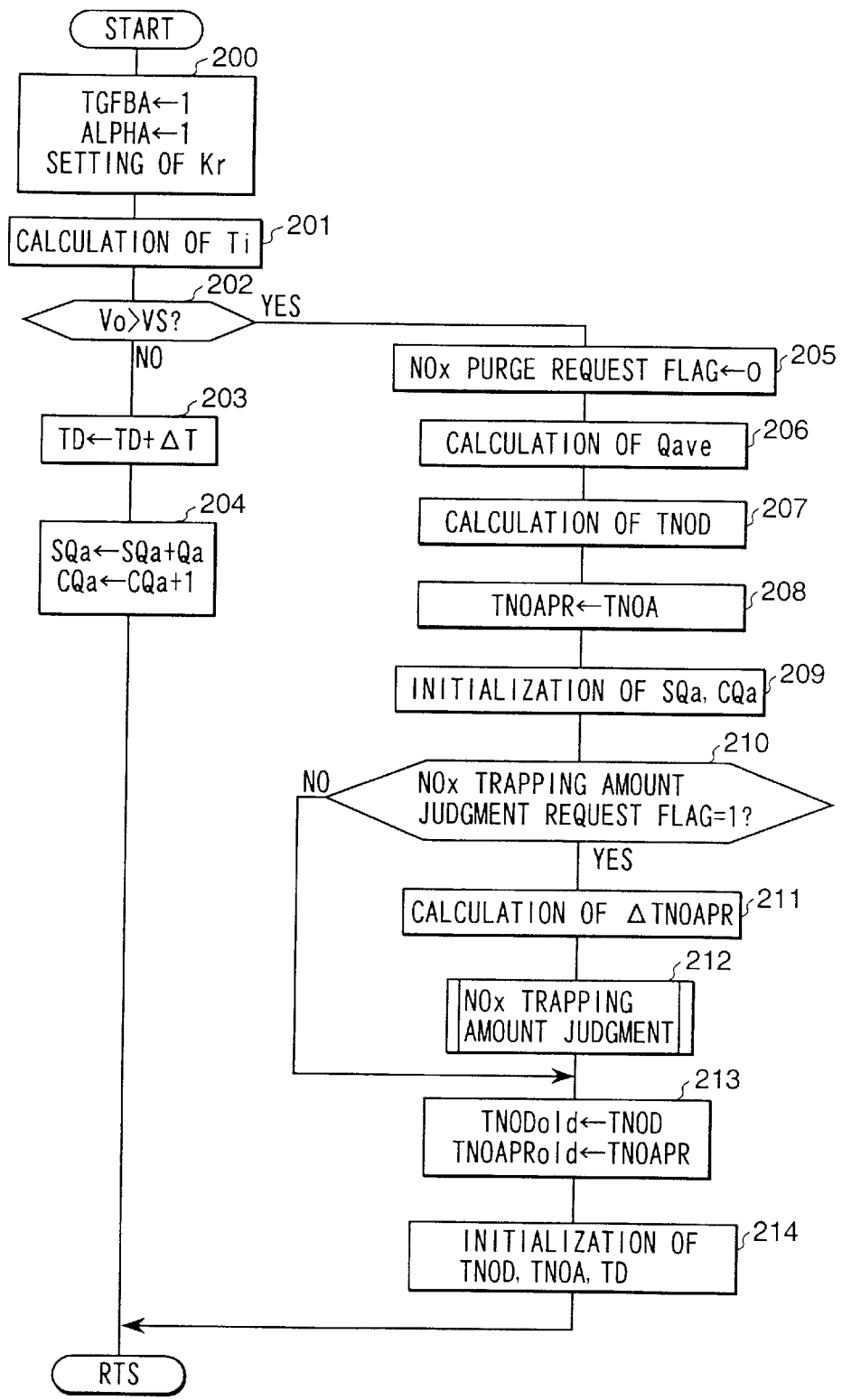
FIG. 13 is a flowchart explaining the NOx purge control process.

FIG. 13 is a flowchart showing an embodiment of an NOx purge control process. The NOx purge control process corresponds to Step 114 in the flowchart shown in FIG. 12, and is started as a subroutine when the NOx purge control request flag is set.

Initially, in Step 200, the feedback-coefficient ALPHA is set to 1, the target equivalent ratio TGFBA to 1, and the air-fuel ratio correction coefficient Kr during the NOx purge control is set. Further, in order to reduce the shock associated with change in torque generated by the engine 1 due to changing the air-fuel ratio, control of correcting the ignition timing is also performed. Further, in a case where the operation mode before initiating the NOx purge control is the stratified operation mode (the very lean combustion under an air-fuel ratio of 40 to 50 attained by forming the stratified mixed gas), control for switching the operation mode to the homogeneous operation mode (the operation mode homogeneously supplying fuel) is also performed. Accordingly, control of the opening degree of the swirl control valve 6, control of the EGR rate, change of the fuel injection timing and control of decreasing the intake air amount are performed. Further, when an acceleration request is generated to started the control, control of increasing the air flow rate Qa supplied to the engine 1 and control of the air-fuel ratio corresponding to the acceleration level are also performed.

The fuel injection time period Ti is calculated in the next Step 201 using the following equation.

$$Ti = K \cdot (Qa/Ne) \cdot TGFBA \cdot ALPHA \cdot Kr$$
$$= K \cdot (Qa/Ne) \cdot Kr$$

In the next Step 202, it is checked whether or not Vo exceeds VS1. If Vo does not exceed VS1, DT is incremented by ΔT (control starting period) in the next Step 203 (may be incremented by 1) because the oxygen and the NOx storaged in the NOx trapping agent 15 and so on are being released and desorbed. In the next Step 204, the accumulation value SQa of the air flow rate Qa and the accumulation time counter CQa are updated.

If Vo exceeds VS2 in Steo 202, the processing proceeds to Step 206 in order to complete the process because the desorption of NOz is completed. At that time point, TD becomes a value measuring the time period from starting the NOx purge control to the time when Vo becomes VS. The NOx purge request flag is cleared (=0) in Step 205, and in the next Step 206, the average air flow rate Qave during releasing and desorbing NOx and so on is calculated using the following equation.

$$Qave = SQa/CQa$$

In the next Step 207, the NOx trapping amount detected value TNOD is calculated using the following equation. At that time point, TNOD includes the part of oxygen storage amount.

$$TNOD=k'\cdot Qave\cdot Kr\cdot TD$$

In the next Step 208, the estimated NOx trapping amount at the time when the NOx purge control is started is storaged as TNOAPR.

In the next Step 209, SQa and CQa are initialized. In the next Step 210, it is checked whether or not the NOx trapping amount judgment request flag is set. If not set, the processing proceeds to Step 213. If sets, the a processing proceeds to Step 211. In Step 211, ΔTNOAPR is calculated as a difference between the estimated NOx trapping amount in the preceding time TNOAPRold (to be described later) and the estimated NOx trapping amount TNOAPR in this time. The processing proceeds to the next Step 212 to execute an NOx trapping amount judging subroutine (to be described later), and then the processing proceeds to Step 213.

In Step 213, TNOA is storaged as TNOAold, and TNOAPR as TNOAPRold for the calculation in the next time.

In the next Step 214, TNOD, TNOA and TD are initialized, and the control flow is completed. In the case where the operation mode before starting the NOx purge control is the stratified operation mode, the control for switching the operation mode from the homogeneous operation mode to the stratified operation mode, and then this control flow is completed.

Figure 14:
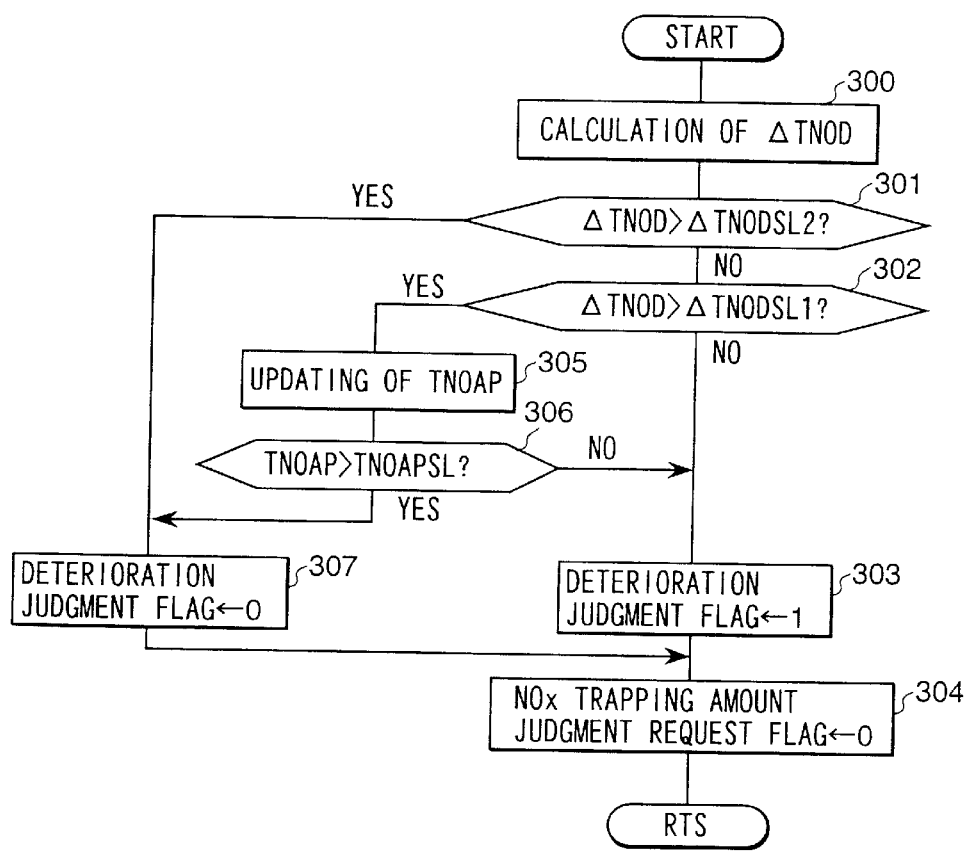
FIG. 14 is a flowchart explaining the NOx trapping amount judging process.

FIG. 14 is a flowchart showing an embodiment of an NOx trapping amount judging process. The NOx trapping amount judging process corresponds to Step 212 of the flowchart shown in FIG. 13, and is started as a subroutine when the NOx trapping amount judgment request flag is set.

Initally, in Step 300, ΔTNOAPR is calculated as a difference between the estimated NOx trapping amount in the preceding time TNOAPRold and the estimated NOx trapping amount TNOAPR in this time.

In the next Step 301, it is checked whether or not ΔTNOD is lager than a judgment value ΔTNODSL2. ΔTNODSL2 is obtained by searching a table corresponding to ΔTNOAPR (the estimated NOx trapping amounts in the preceding time and this time). If larger, it is judged that the NOx trapping amount has a sufficient margin, and the processing proceeds to Step 307 to clear the deterioration judgment flag (=0), and then this control flow is completed. If not large, the processing proceeds to Step 302.

In Step 302, it is checked whether or not ΔTNOD is lager than a judgment value ΔTNODSL1 (a value smaller than ΔTNODSL2). ΔTNODSL1 is obtained by searching a table corresponding to ΔTNOAPR, or can be calculated by multiplying an appropriate coefficient (less than 1) to ΔTNODSL1. If larger, it is judged that the NOx trapping amount needs to be decreased though the NOx trapping amount has a small margin, and the processing proceeds to Step 307 to update the threshold TNOAP for starting the NOx purge control to a slightly smaller value.

$$TNOAP=TNOAP-TNOAPC$$

The decrement TNOAPC used for updating is calculated corresponding to ΔTNOD and ΔTNOAPR. For example, the following equation is used.

$$TNOAPC=knp\times(TNOAPR-\Delta TNOD),$$

where knp is a coefficient, and a value near 1.

In the next Step 306, it is checked whether or not TNOAP is larger than TNOAPSL. If larger, the deterioration judgment flag is cleared (=0) in Step 307. If not larger, it is judged that the NOx trapping agent 15 is deteriorated, and the deterioration judgment flag is set (=1) in Step 303.

Even if it is judged in the above-described Step 302 that ΔTNOD is not lager than a judgment value ΔTNODSL1, it is judged that the NOx trapping amount does not have any margin at all, and the deterioration judgment flag is set (=1) in Step 303.

After completing the process of Step 307 or 303, the NOx trapping amount judgment request flag is cleared (=0), and then this control flow is completed.

When the deterioration judgment flag is set, the code expressing deterioration of the NOx trapping agent 15 is storaged, and a warning is made to the driver by switching on the warning light.

Although the description of the present embodiment has been made on the case where TNOAP is updated to a value in the smaller value side, the present invention is not limited to the embodiment. For example, in the case where ΔTNOD is sufficiently large, NOAP may be updated a value in the larger value side. Further, In the present embodiment, when TNOAP is becomes smaller than the judgment value TNOASL by being updated or when ΔTNOD becomes smaller than ΔTNODSL, it is judged that the NOx trapping agent 15 is deteriorated. However, the present invention is not limited to the above judgment conditions. For example, the judgment may be performed by employing only one of the conditions.

In the case where the cleaning performance and the oxygen storage capacity of the catalyst arranged at an upstream position and the NOx trapping agent 15 are separately detected, it is preferable that the various kinds of judgment values are variable corresponding to the detected results.

Although the embodiments have been described above, it is to be understood that the present invention is not limited to the embodiments.

For example, although the embodiment of the present invention has been described taking the gasoline engine of an in-cylinder injection type, the present invention is not limited to the gasoline engine of an in-cylinder injection type. The method of judging the NOx trapping amount using the air-fuel ratio sensor or the like arranged downstream of the NOx trapping agent, which is the essential part of the present invention, can be applied to a gasoline engine of a port injection type and to a diesel engine.

What is claimed is:

1. An engine exhaust gas cleaning system, comprising:
   an NOx trapping agent arranged inside an exhaust gas passage of an engine, said NOx trapping agent trapping by absorbing or adsorbing NOx in an exhaust gas when an air-fuel ratio of the exhaust gas flowing thereinto is a lean air-fuel ratio, purging by at least one of releasing and reducing the trapped NOx when a concentration of oxygen in the exhaust gas is reduced;
   an air-fuel ratio changing means for temporarily changing the air-fuel ratio of the exhaust gas from a lean air-fuel ratio to a stoichiometric air-fuel ratio or a rich air-fuel ratio with a preset period;
   a concentration detecting means for detecting a concentration of a specified component in the exhaust gas at a position downstream of said NOx trapping agent in the exhaust gas passage;
   an operating control parameter changing means for changing operating control parameters of said engine in order to change an amount of NOx trapped to said NOx trapping agent with the lean air-fuel ratio; and an NOx trapping amount change detecting means for detecting change in the amount of NOx trapped to said NOx trapping agent based on change in detected results of said concentration detecting means at the time of said air-fuel ratio changing means temporarily changing the air-fuel ratio of the exhaust gas to the stoichiometric air-fuel ratio or the rich air-fuel ratio when said operating control parameter changing means changes the operating control parameters to change the amount of trapped NOx.

2. An engine exhaust gas cleaning system according to claim 1, wherein said operating control parameter changing means changes a time period in which the air-fuel ratio of the exhaust gas is lean.

3. An engine exhaust gas cleaning system according to claim 1, wherein said operating control parameter changing means changes a releasing amount of NOx from said engine during a time period in which the air-fuel ratio of the exhaust gas is lean.

4. An engine exhaust gas cleaning system according to claim 1, wherein said operating control parameter changing means changes at least any one of ignition timing, fuel injection timing, an EGR ratio and an air-fuel ratio in order to change a releasing amount of NOx from said engine during a time period in which the air-fuel ratio of the exhaust gas is lean.

5. An engine exhaust gas cleaning system according to claim 1, wherein said concentration detecting means measures any one of oxygen concentration, NOx concentration, HC concentration and CO concentration in the exhaust gas.

6. An engine exhaust gas cleaning system according to claim 1, wherein said operating control parameter changing means changes the operating parameter in order to increase or decrease a predetermined NOx trapping amount, and said engine exhaust gas cleaning system further comprises an NOx trapping agent performance judging means for judging NOx trapping performance of said NOx trapping agent based on a detecting result of said NOx trapping amount change detecting means.

7. An engine exhaust gas cleaning system according to claim 6, wherein said NOx trapping agent performance judging means judges that the NOx trapping performance of said NOx trapping agent is deteriorated when a detecting result of said NOx trapping amount change detecting means is not larger than a predetermined value.

8. An engine exhaust gas cleaning system according to claim 1, wherein said operating control parameter changing means changes the operating parameter in order to increase or decrease a predetermined NOx trapping amount, and said engine exhaust gas cleaning system further comprises a lean operating time period changing means for changing a time period in which the air-fuel ratio of the exhaust gas is lean based on a detected result of said NOx trapping amount change detecting means.

9. An engine exhaust gas cleaning system according to claim 8, which comprises an NOx trapping performance judging means for judging that the NOx trapping performance of said NOx trapping agent is deteriorated when a lean operating time period changed by said lean operating time period changing means becomes smaller than a predetermined value.

10. An engine exhaust gas cleaning system according to claim 6, which comprises a lean operation limiting means for limiting lean operation when said NOx trapping performance judging means judges that said NOx trapping agent is deteriorated.

11. An engine exhaust gas cleaning system according to claim 6, wherein means is provided for at least one of memorizing a code expressing deterioration of said NOx trapping agent and generating a warning when said NOx trapping performance judging means judges that said NOx trapping agent is deteriorated.

12. An engine exhaust gas cleaning system, comprising:
an NOx trapping agent arranged inside an exhaust gas passage of an engine, wherein said $NO_x$ trapping agent absorbs or adsorbs $NO_x$ in an exhaust gas having a lean air-fuel ratio and releases or reduces the trapped $NO_x$ when a concentration of oxygen in the exhaust gas is reduced;

an air-fuel ratio changer that temporarily changes the air-fuel ratio of the exhaust gas from a lean air-fuel ratio to a stoichiometric air-fuel ratio or a rich air-fuel ratio with a preset period;

a concentration detector that detects a concentration of a specified component in the exhaust gas at a position downstream of said $NO_x$ trapping agent in the exhaust gas passage;

an operating controller that controls parameters of said engine to change an amount of $NO_x$ trapped to said $NO_x$ trapping agent; and an $NO_x$ trapping amount detector that detects the amount of $NO_x$ trapped by said $NO_x$ trapping agent based on change in a detected result of said concentration detector at the time of said air-fuel ratio changer changes the air-fuel ratio of the exhaust gas to the stoichiometric air-fuel ratio or the rich air-fuel ratio when said operating controller changes the operating control parameters to change the amount of trapped $NO_x$.

13. A method for cleaning an engine exhaust gas, comprising:
absorbing or adsorbing $NO_x$ in an exhaust gas having a lean air-fuel ratio on an $NO_x$ trapping agent arranged inside an exhaust gas passage of an engine;

temporarily changing an air-fuel ratio of the exhaust gas from a lean air-fuel ratio to a stoichiometric or a rich air-fuel ratio for a preset period;

releasing trapped $NO_x$;

detecting a concentration of at least one of oxygen, $NO_x$, hydrocarbon, or carbon monoxide in the exhaust gas at a position downstream of said $NO_x$ trapping agent;

changing at least one of ignition timing, fuel injection timing, an EGR ratio, or an air-fuel ratio, thereby increasing or decreasing an amount of $NO_x$ trapped by said $NO_x$ trapping agent; and determining the amount of trapped $NO_x$ based on a change in a detected concentration at a time of temporarily changing said air-fuel ratio during said changing at least one of ignition timing, fuel injection timing, an EGR ratio, or an air-fuel ratio.

14. An engine exhaust gas cleaning system, comprising:
an NOx trapping agent arranged inside an exhaust gas passage of said engine for trapping NOx in an exhaust gas when an air-fuel ratio is a lean air-fuel ratio and releasing said trapped NOx when said air-fuel ratio is a rich air-fuel ratio;

means for detecting a concentration of a specified component in said exhaust gas arranged at a position downstream of said NOx trapping agent;

means for changing operating condition of said engine in order to change an amount of NOx to be trapped in said NOx trapping agent; and means for computing change in the amount of NOx trapped in said NOx trapping agent based on change in a detected result of said concentration detecting means when said air-fuel ratio is changed from the lean air-fuel ratio to a stoichiometric air-fuel ratio or to the rich air-fuel ratio by said operating control parameter changing means.

15. The engine exhaust gas cleaning system according to claim 14, wherein said operating control parameter changing means changes at least one of ignition timing, fuel injection timing, an EGR ratio, and an air-fuel ratio.

16. The engine exhaust gas cleaning system according to claim 14, wherein said concentration detecting means measures any one of oxygen concentration, NOx concentration, HC concentration, and CO concentration.

17. The engine exhaust gas cleaning system according to claim 14, further comprising means for judging NOx trapping performance of said NOx trapping agent based on a detected result of said NOx trapping amount change detecting means.

18. The engine exhaust gas cleaning system according to claim 17, wherein said NOx trapping agent performance judging means is given a predetermined criterion-value to judge if the NOx trapping performance of said NOx trapping agent is deteriorated based on the detected result of said NOx trapping amount change detecting means or on said lean operating time period.

19. The engine exhaust gas cleaning system according to claim 14, further comprising means for changing a lean operating time period based on the detected result of said NOx trapping amount change detecting means.

20. The engine exhaust gas cleaning system according to claim 19, further comprising means for limiting said lean operation based on the deterioration judgment result of said NOx trapping performance judging means.

21. The engine exhaust gas cleaning system according to claim 20, further comprising at least one of means for memorizing a code expressing the result of the deterioration judgment of said NOx trapping performance judging means and means for warning to express said result.

* * * * *